July 7, 1964 M. HALL 3,139,714
MACHINE FOR LOADING STACKS OF PACKAGES IN CARTONS
Filed Feb. 28, 1962 14 Sheets-Sheet 1
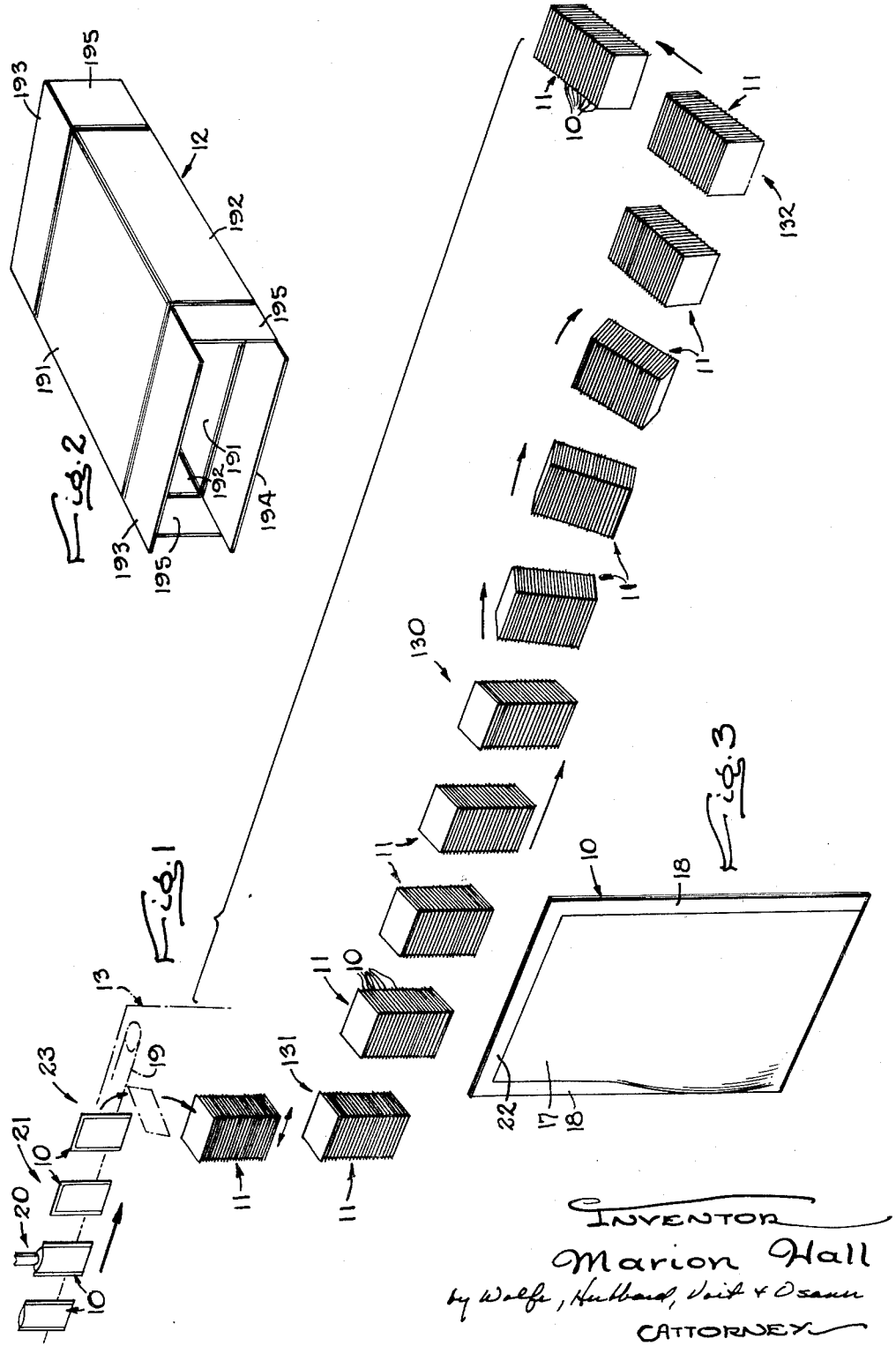

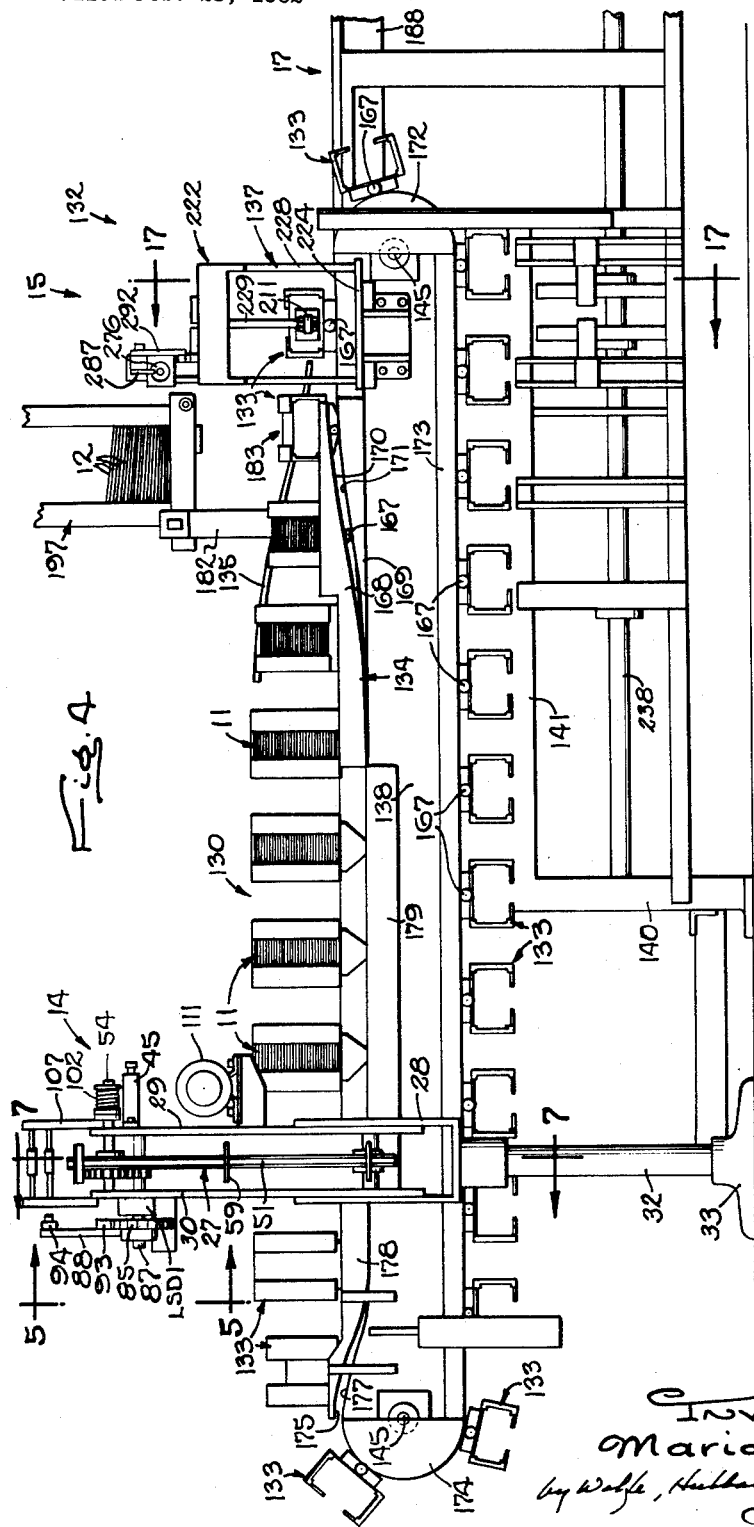

July 7, 1964
M. HALL
3,139,714
MACHINE FOR LOADING STACKS OF PACKAGES IN CARTONS
Filed Feb. 28, 1962
14 Sheets-Sheet 3
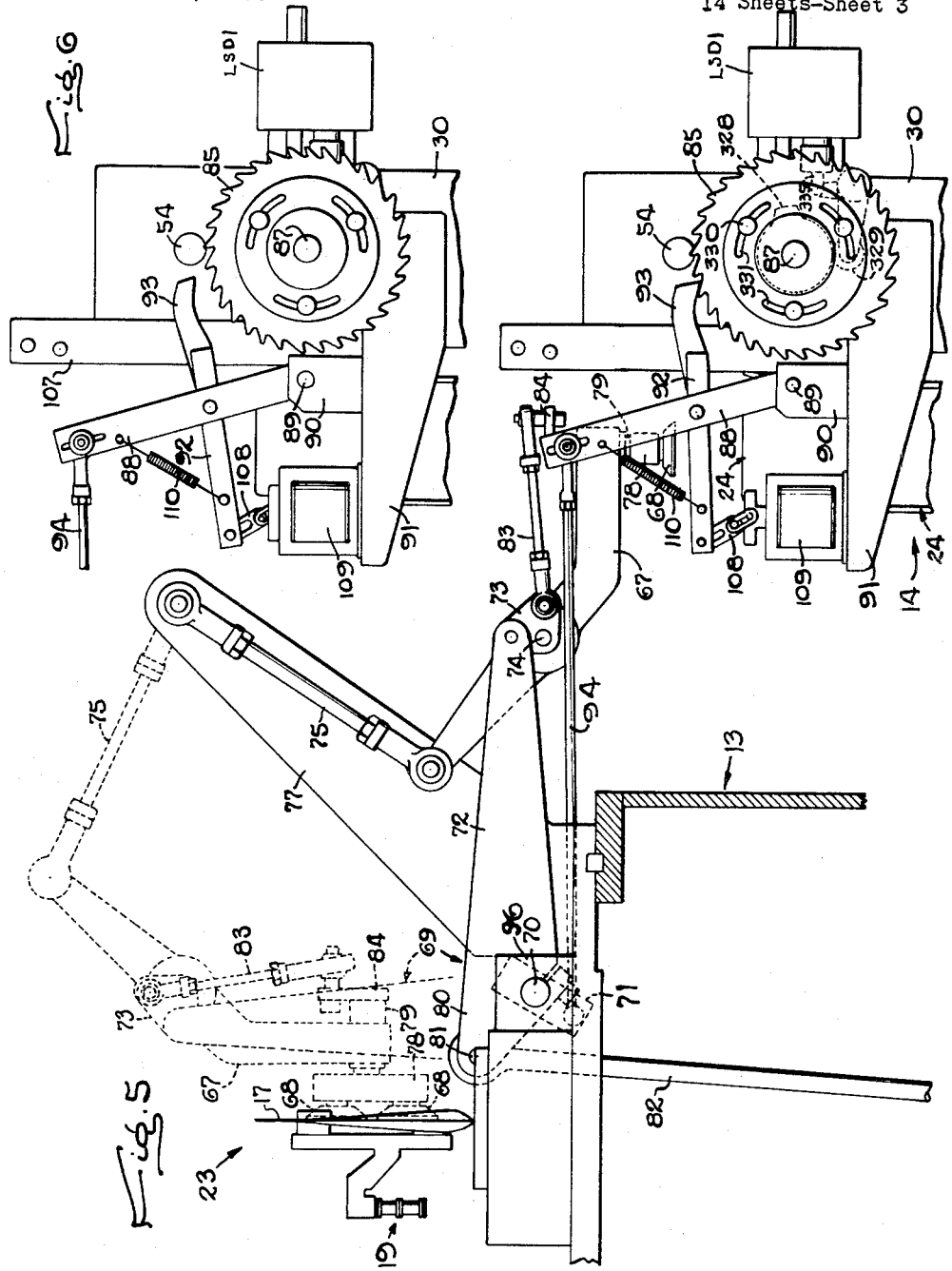

July 7, 1964     M. HALL     3,139,714
MACHINE FOR LOADING STACKS OF PACKAGES IN CARTONS
Filed Feb. 28, 1962     14 Sheets-Sheet 4
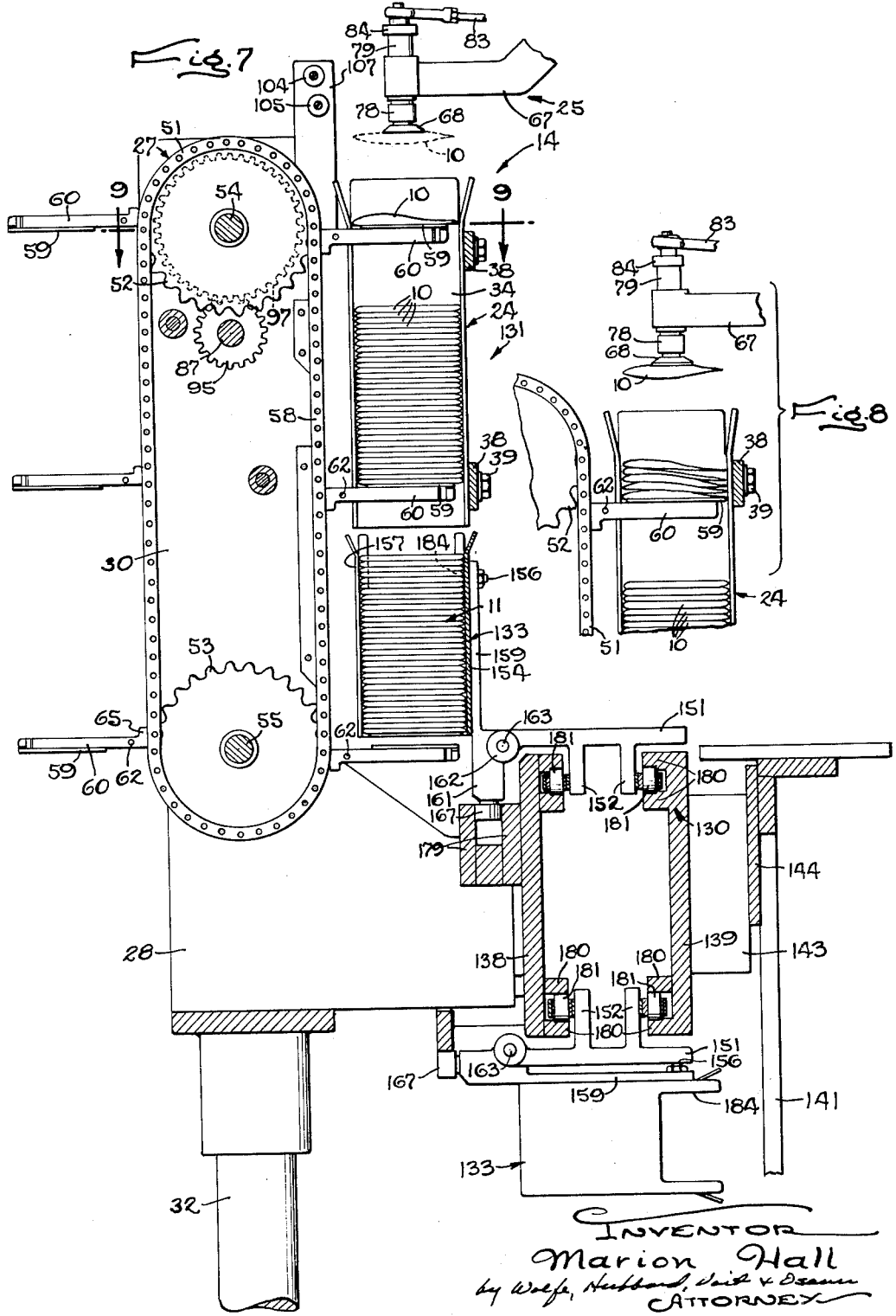

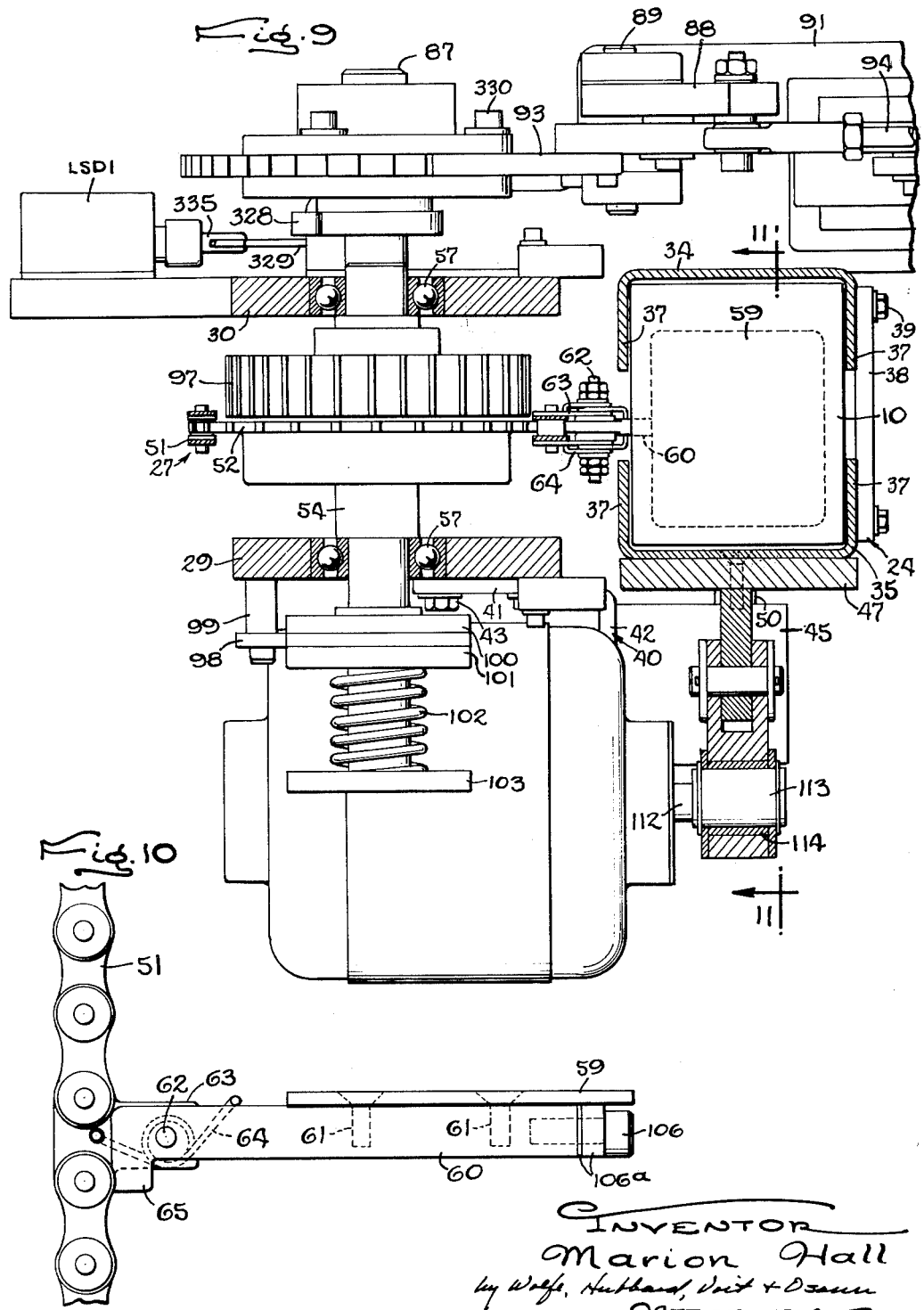

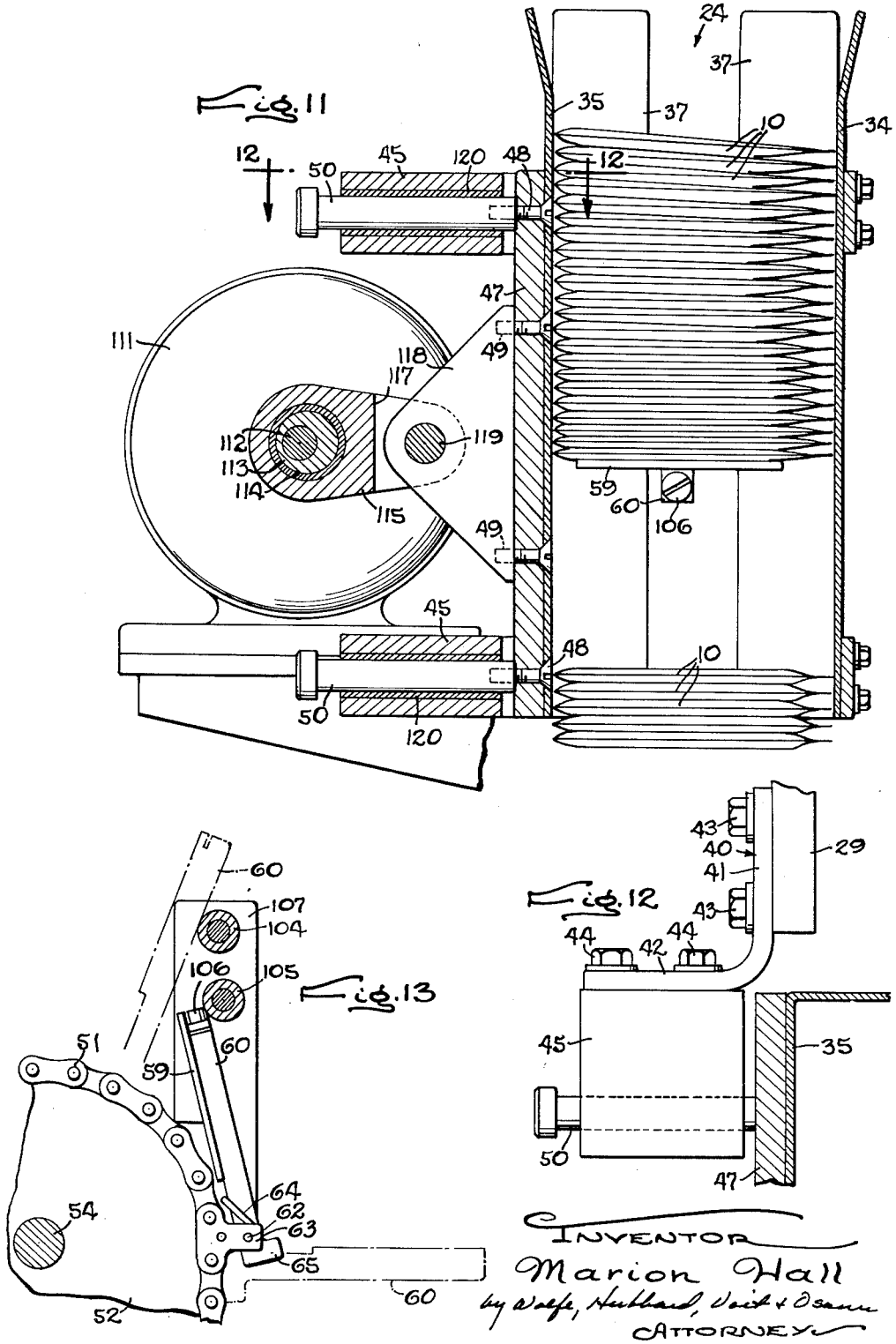

July 7, 1964 M. HALL 3,139,714
MACHINE FOR LOADING STACKS OF PACKAGES IN CARTONS
Filed Feb. 28, 1962 14 Sheets-Sheet 7
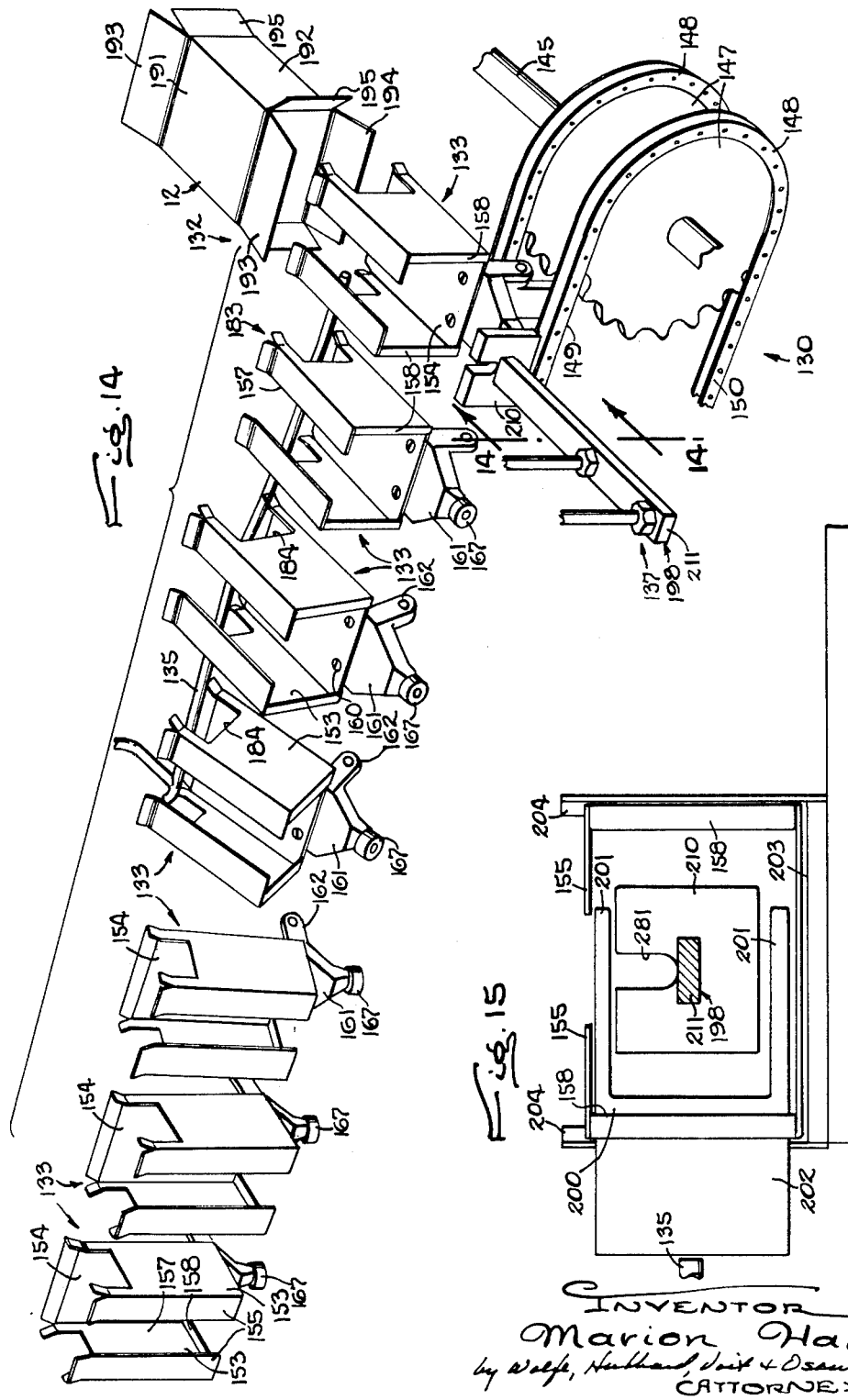

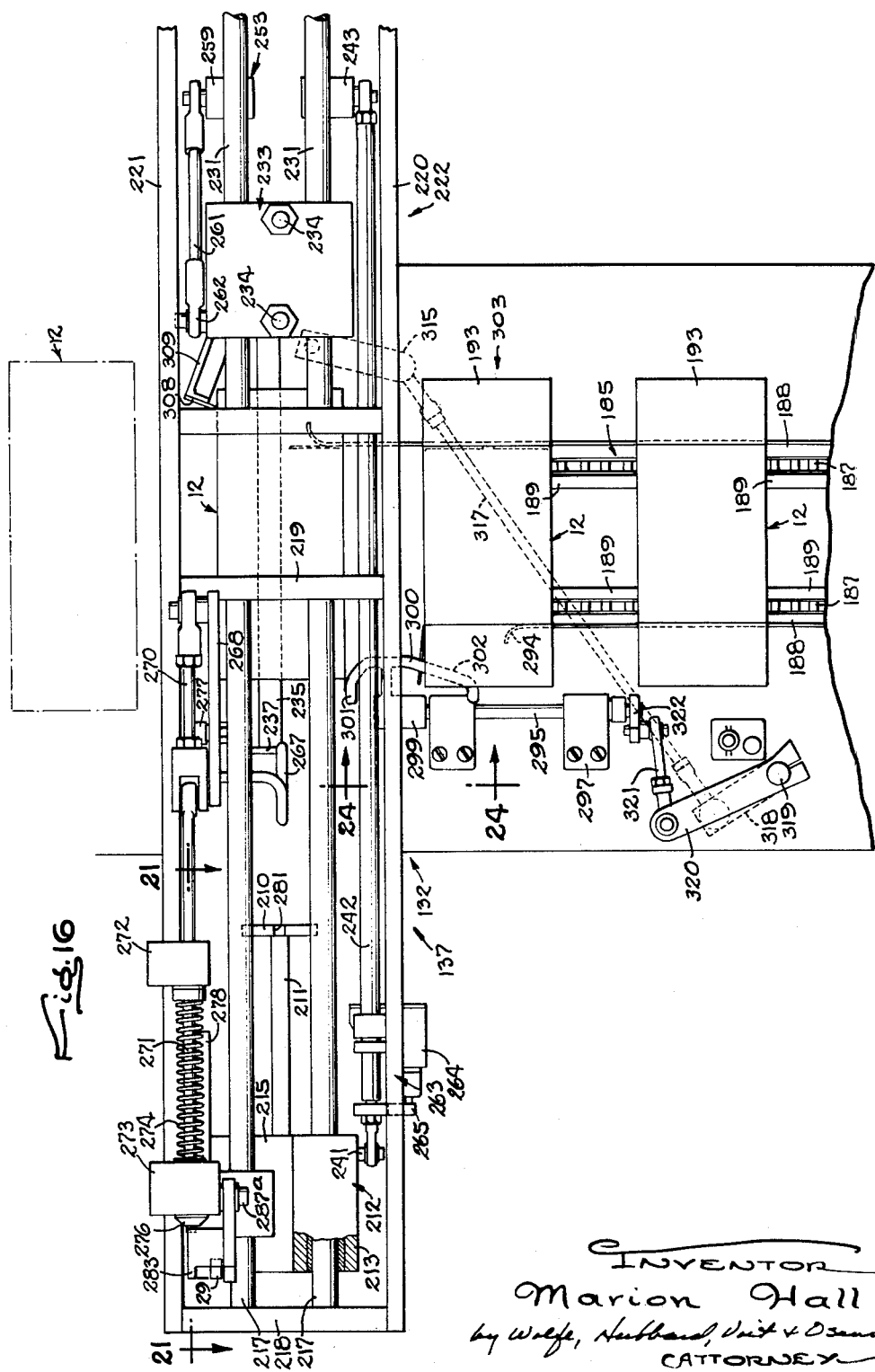

July 7, 1964  M. HALL  3,139,714
MACHINE FOR LOADING STACKS OF PACKAGES IN CARTONS
Filed Feb. 28, 1962  14 Sheets-Sheet 9
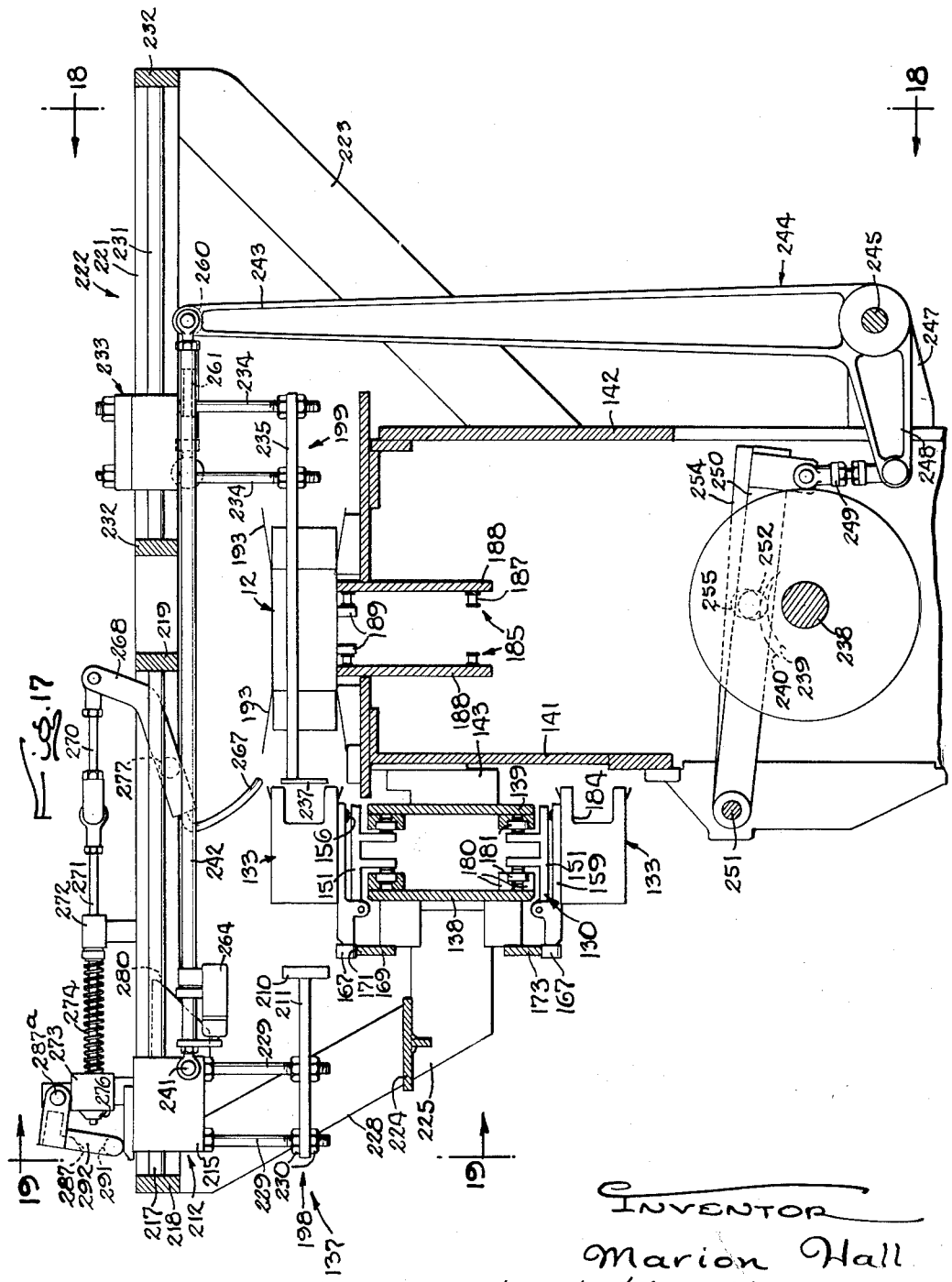
INVENTOR
Marion Hall
by Wolfe, Hubbard, Voit & Osann
ATTORNEYS

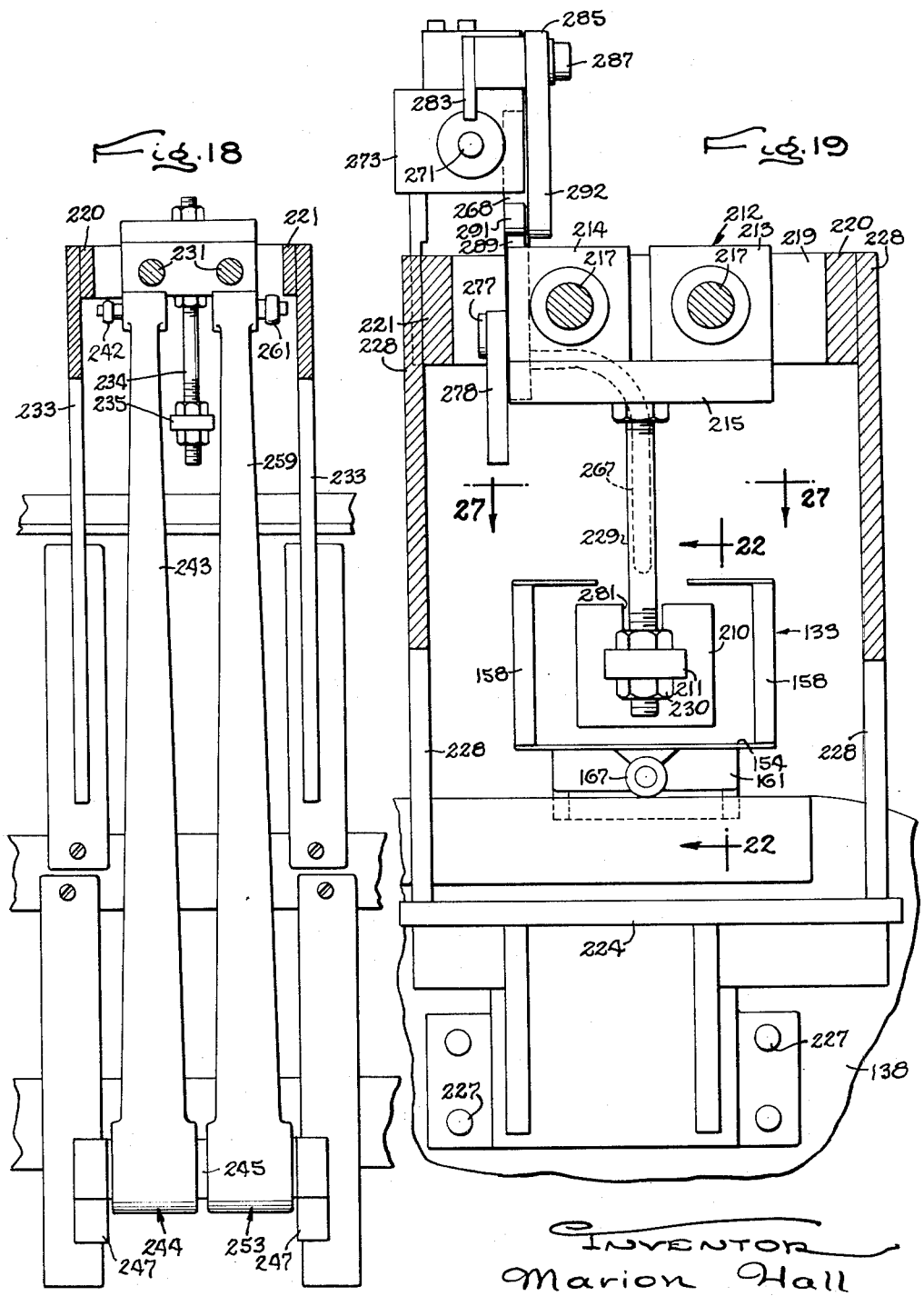

July 7, 1964 M. HALL 3,139,714
MACHINE FOR LOADING STACKS OF PACKAGES IN CARTONS
Filed Feb. 28, 1962 14 Sheets-Sheet 11
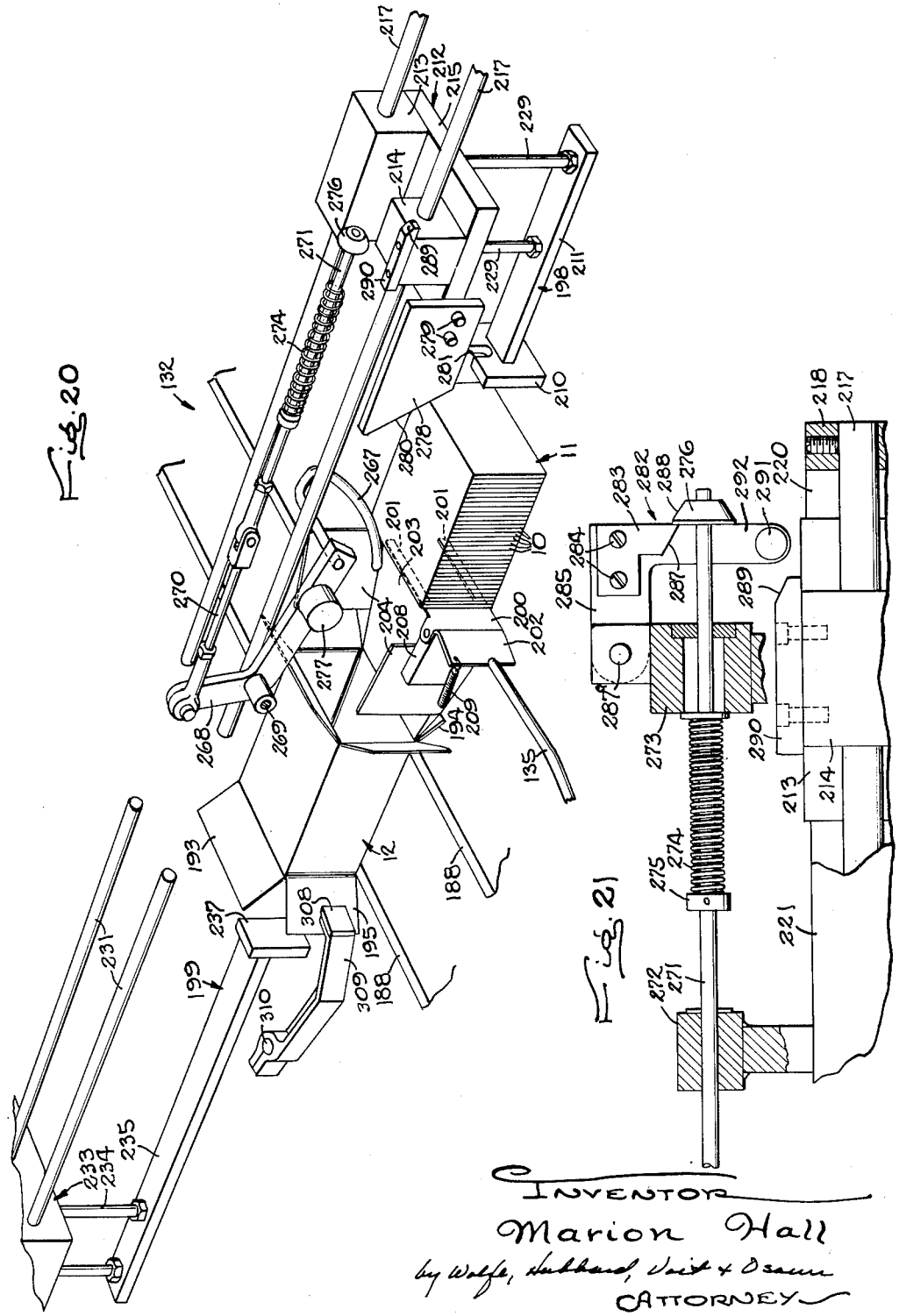
INVENTOR
Marion Hall
by Wolfe, Hubbard, Voit & Osann
ATTORNEY

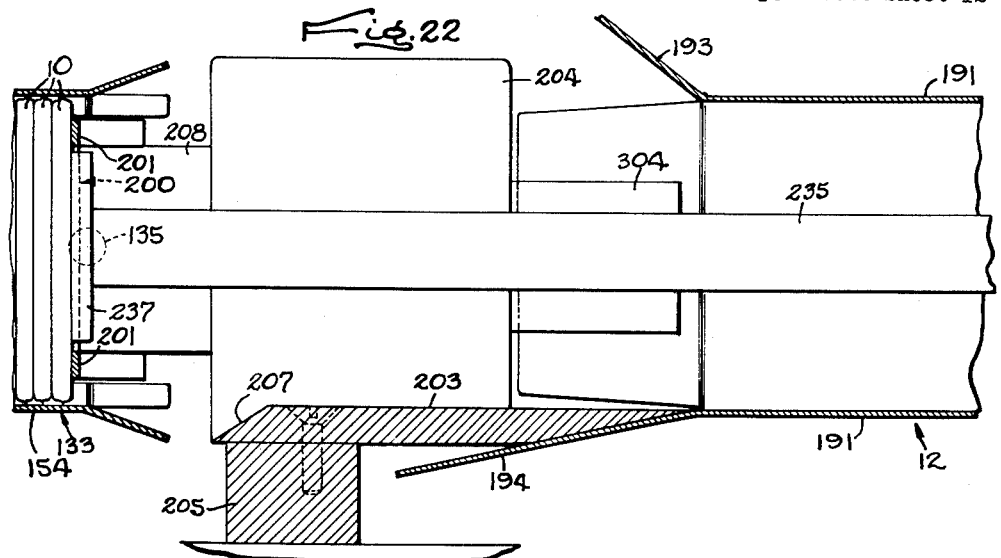
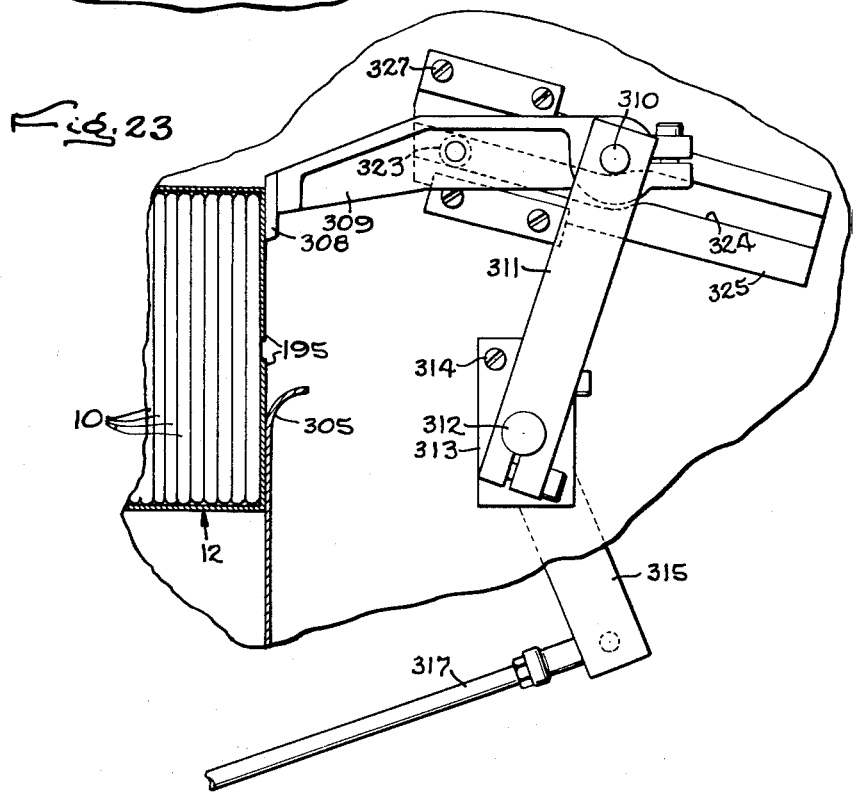

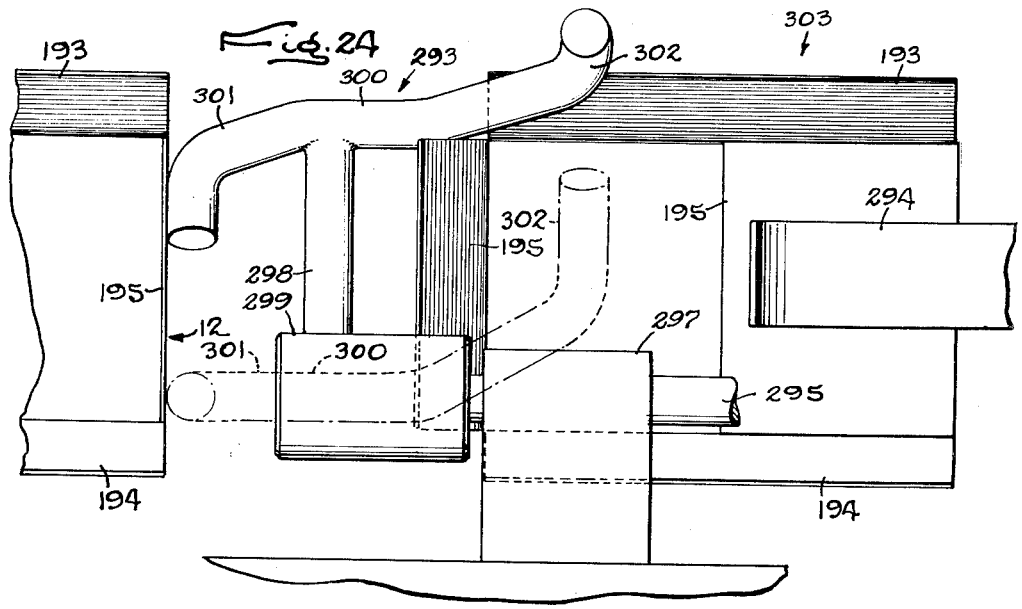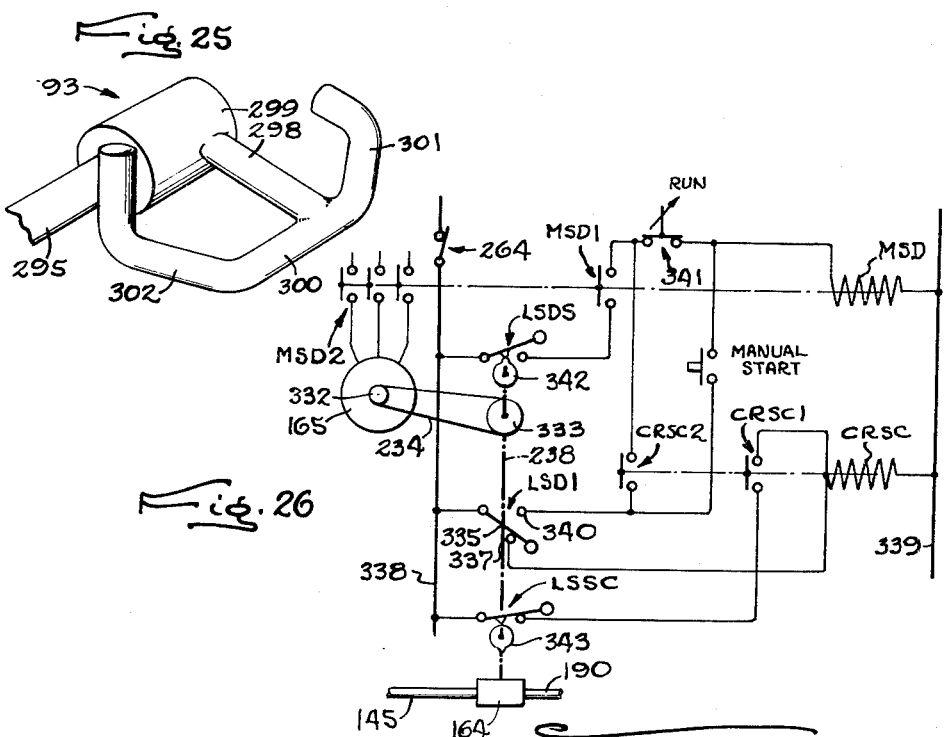

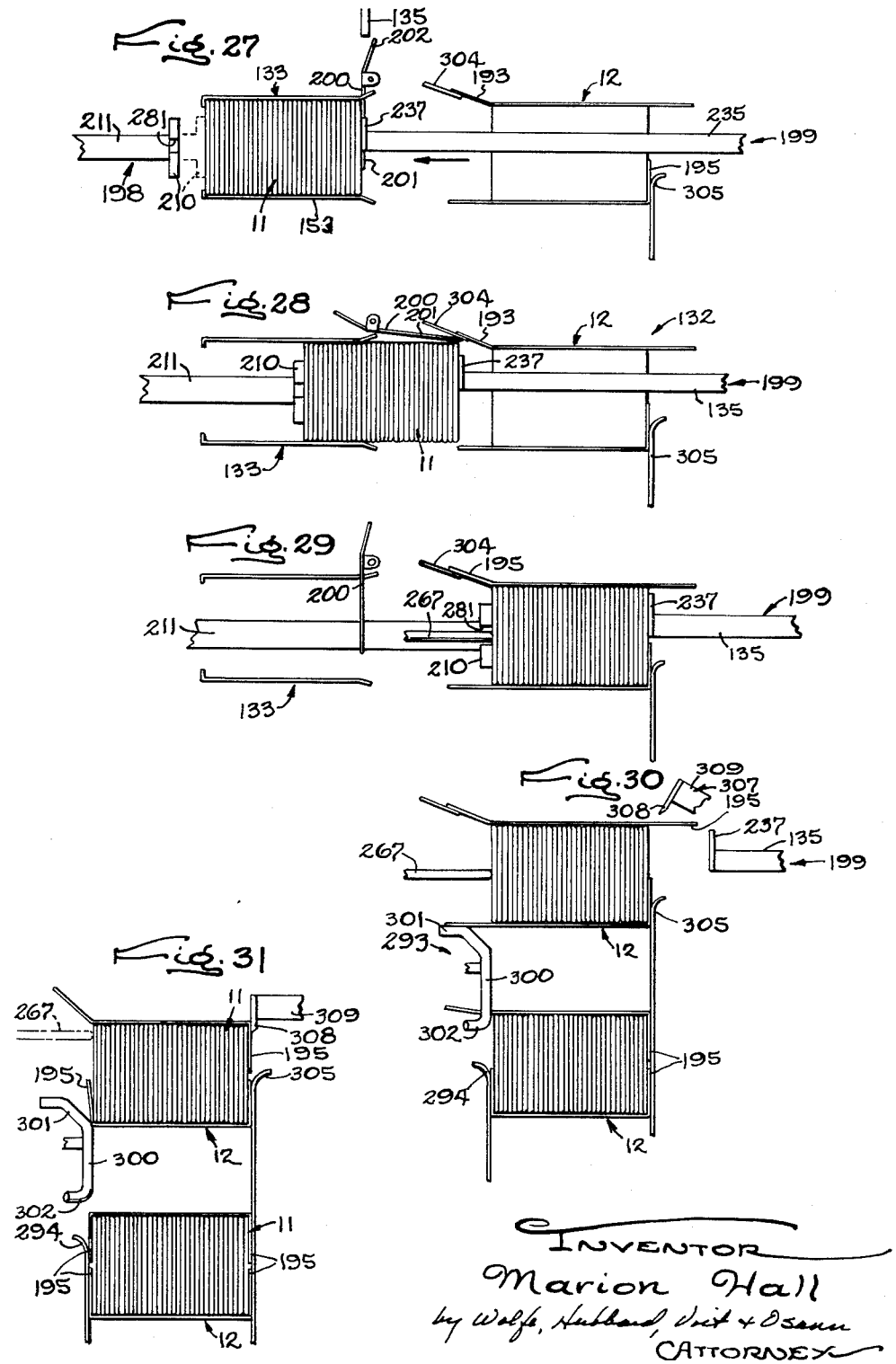

United States Patent Office 3,139,714
Patented July 7, 1964

3,139,714
MACHINE FOR LOADING STACKS OF PACKAGES IN CARTONS
Marion Hall, 912 Woodland Drive, Rockford, Ill.; Lillian E. Hall, administrator of said Marion Hall, deceased
Filed Feb. 28, 1962, Ser. No. 176,220
13 Claims. (Cl. 53—159)

This invention relates to an automatic machine for arranging flat packages of predetermined size side by side in relatively large stacks and transferring the stacks to and loading them in cartons or boxes.

The general object of the present invention is to provide novel apparatus of the above character which facilitates rapid handling of large stacks and maintains the packages in tightly stacked side-by-side relation so that a relatively large number of bags may be packed in a relatively small carton.

Another object is first to arrange the packages in upright stacks in holders spaced along a carrier and advanced between a receiving station and a loading station and to overturn the holders and stacks into reclining positions for transfer horizontally into cartons at the loading station.

Another object is to hold the stacks in a novel manner against falling out of the holders during and after the overturning operation.

A further object is to provide a novel loader operable to engage the stacks and transfer the same out of the holders while pressing the packages in the stacks together to maintain the tightly stacked relation of the packages.

A more specific object is to accomplish the foregoing by using a loader including two rams movable into engagement with opposite ends of the stack, then in unison toward the carton to carry the stack into the carton, and finally in opposite directions to leave the stack in the carton.

Another object is to hold the stacks against falling out of the cartons after the rams have moved away from the stack and until the carton ends have been at least partially closed over the stack ends.

A further object is to provide a novel device for closing both the leading and trailing side flaps of the cartons after the stacks have been loaded therein.

Other objects and advantages of the invention will become apparent from the following detailed description taken in connection with the accompanying drawings, in which FIGURE 1 is a schematic perspective view of the packaging machine showing the end of the package forming and filling machine, the stacking machine, the stack carrier, and the loading station of the cartoning machine.

FIG. 2 is a perspective view of a carton.

FIG. 3 is an enlarged perspective view of the packages shown in FIG. 1.

FIG. 4 is a fragmentary side elevational view of the machine embodying the novel features of the present invention.

FIG. 5 is an enlarged fragmentary sectional view taken along the line 5—5 of FIG. 4.

FIG. 6 is a view of a portion of FIG. 5 with the parts shown in different positions.

FIG. 7 is an enlarged fragmentary sectional view taken along the line 7—7 of FIG. 4.

FIG. 8 is a view of a portion of FIG. 7 with the parts in different positions.

FIG. 9 is an enlarged fragmentary sectional view taken along the line 9—9 of FIG. 7.

FIG. 10 is an enlarged view of a portion of FIG. 7.

FIG. 11 is an enlarged fragmentary sectional view taken along the line 11—11 of FIG. 9.

FIG. 12 is an enlarged fragmentary sectional view taken along the line 12—12 of FIG. 11.

FIG. 13 is an enlarged view of a portion of FIG. 7 with the parts in different positions.

FIG. 14 is an enlarged fragmentary perspective view of a portion of FIG. 4.

FIG. 15 is an enlarged fragmentary sectional view taken along the line 15—15 of FIG. 14.

FIG. 16 is an enlarged fragmentary plan view of a portion of the machine shown in FIG. 4.

FIG. 17 is an enlarged fragmentary sectional view taken along the line 17—17 of FIG. 4.

FIG. 18 is an enlarged fragmentary sectional view taken along the line 18—18 of FIG. 17.

FIG. 19 is an enlarged fragmentary sectional view taken along the line 19—19 of FIG. 17.

FIG. 20 is an enlarged fragmentary perspective view of part of FIG. 17.

FIG. 21 is an enlarged fragmentary view taken along the line 21—21 of FIG. 16 partly broken away and shown in section with the parts in different positions.

FIG. 22 is an enlarged fragmentary sectional view taken along the line 22—22 of FIG. 19.

FIG. 23 is an enlarged fragmentary view of a portion of FIG. 16, with the parts in the different positions, the view being taken in a horizontal plane through the holder at the loading station.

FIG. 24 is an enlarged fragmentary sectional view taken along the line 24—24 of FIG. 16.

FIG. 25 is a perspective view of a portion of FIG. 24 on a slightly reduced scale.

FIG. 26 is a circuit diagram.

FIG. 27 is a fragmentary diagrammatic view taken substantially along the line 27—27 of FIG. 19 and showing a step in the transfer of stacks from a holder into a carton.

FIG. 28 is a view similar to FIG. 27 showing the parts in different positions.

FIG. 29 is a view similar to FIG. 27 showing a further step of the transfer.

FIG. 30 is a view similar to a portion of FIG. 29 showing the next step.

FIG. 31 is a view similar to FIG. 30 showing the next step including partial closing of the carton.

For purposes of illustration, the invention is shown in the drawings incorporated in a high speed machine for packaging loose material such as powdered gelatin in flat, envelope-type bags 10 which are then arranged in compact stacks 11 to be packed in cartons 12 (FIGS. 2 and 14). Each of these stacks comprises a relatively large number of bags, thirty-two in this instance, disposed in side-by-side relation. Preferably, the packaging, stacking and cartoning operations are accomplished through the correlated use of a machine 13 (FIGS. 1 and 5) for forming, filling and closing the bags, a machine 14 (see FIGS. 4 and 7) for stacking the bags preparatory to loading the bags in cartons, and a machine 15 (see FIG. 4) for filling and closing the cartons.

The packaging machine 13 may be of the type shown in Bartelt Patent No. 2,649,674 to which reference is made for details of construction and operation not included herein. Generally, a machine of this type forms bags comprising two coextensive side panels 17 (FIG. 3) disposed in opposed face-to-face relation and joined together along corresponding edges as by heat seals 18. During forming and filling, the bags are advanced edge to edge along a carrier 19 (FIGS. 1 and 5) and past a filling station 20 where each bag receives a measured charge of material through its open upper end. Then, the bags are carried through a closing station 21 and are closed by seals 22 along the upper edges.

At a discharge station 23 at the end of the carrier, the bags are transferred one at a time onto the stacking machine 14. While the stacking may be accomplished in various ways, herein the stacking machine includes generally a vertical chute 24 (see FIGS. 7 through 13) for receiving the bags, a device 25 (see FIG. 5) for picking up successive bags at the discharge station 23 and carrying them to the chute, and a conveyor 27 (FIGS. 4 and 7) movable down the chute in timed relation with the advance of the bags to support the bags in the chute while arranging the bags in stacks of the desired size. These machine elements preferably are supported alongside the discharge end of the packaging machine on a frame formed by spaced vertical rails 29 and 30 secured at their lower ends to the upright legs 31 (FIGS. 4 and 7) of a generally U-shaped yoke 28. The latter is fast on the upper end of a post 32 upstanding from a floor-engaging base 33.

To form the chute 24, two elongated channels 34 and 35 of U-shaped cross-section are fastened together to open toward each other with the adjacent edges 37 of the channels spaced apart to form slots extending longitudinally of the chute on opposite sides thereof. This may be accomplished by means of bars 38 (FIGS. 7 and 9) bridging the slot on one side of the chute and each fastened to both channels by bolts 39. The chute is mounted on the stacking machine frame on brackets 40 (see FIGS. 9 and 12) comprising plates having right angle bends forming legs 41 and 42, one leg 41 of each bracket being bolted at 43 to the rail 29 adjacent one edge of the latter and the other leg 42 being fastened at 44 to one edge of a block 45 so that the block is offset from the rail 29. A mounting plate 47 secured to the crosspiece of the channel 35 by machine screws 48 and 49 is supported on horizontal studs 50 projected through the blocks and each receiving a screw 48 through the mounting plate.

In this manner, the chute is supported alongside the rails 29 and 30 with the adjacent slot 37 centered on and opening toward the space between the rails. The inner cross-sectional area of the chute preferably corresponds in shape to the shape of the bag sides 17 and is slightly larger than the bags so that the latter pass freely down the chute. To guide the bags into the top of the chute, the upper edges of the channels may be flared outwardly as shown in FIGS. 7 and 11.

The conveyor 27 includes an endless chain 51 wound around vertically spaced sprocket wheels 52 and 53 fast on shafts 54 and 55 extending between and journaled at opposite ends in anti-friction bearings 57 (FIG. 9) in the rails 29 and 30 so that the chain 51 is disposed in a vertical plane between the two rails and one run 58 of the chain is centered on the slot 37. Carried on the chain are a plurality of evenly spaced flights formed by platforms 59 mounted on arms 60 each secured at one end to the chain. These platforms are spaced along the arms a sufficient distance from the chain to enter and move downwardly through the chute as they pass along the vertical run 58 with the arms extending into the chute through the slot.

Each of the platforms, which are generally rectangular in shape and are smaller than the sides of the bags, is mounted on the associated arm to lie on the upper side of the arm when the latter is on the run 58 and is fastened to the arm by machine screws 61 (FIG. 10). In the present instance, the arms are pivotally supported on the chain on pins 62 (FIGS. 7, 9, 10 and 13) extending through alined holes in the arms and in fingers 63 rigid with the chain. Torsion springs 64 encircling the pivots and fast at one end on the chain are bent at the other end to lie across the upper sides of the arms.

Thus, these springs urge the arms clockwise about the pivot pins as viewed in FIG. 10 and downwardly when the arms are on the run 58. Integral lugs 65 depending from the arms adjacent the chain abut against the chain under the arms to hold the latter and the platforms yieldably in positions perpendicular to the run 58. From the foregoing, it will be seen that the platforms pass through the chute at equal intervals to receive the bags dropped into the chute and divide the bags into equal stacks 11.

The device for transferring the bags 10 from the bag carrier 19 to the chute 24 may take the form of an arm 67 (FIGS. 5, 7 and 8) supported on the packager 13 adjacent the stacking machine 14 and swingable back and forth between the discharge station 23 and the chute in timed relation with the advance of the carrier to pick up each completed bag and carry it to the chute. Herein, this arm carries at its free end a pair of suction cups 68 for gripping the bags at the discharge stations (see FIG. 5) and releasing the bags over the chute (see FIGS. 7 and 8). Vacuum may be applied and released at the appropriate times in a manner well known in the art.

To swing the arm 67 back and forth, a bell crank 69 (FIG. 5) is fulcrumed on a pin 70 fast in a lever 71 and journaled in a block 96 to turn about a horizontal axis. One leg 72 of the crank carries a triangular plate 73 at its outer end and the arm 67 is journaled intermediate its ends on the plate 73 by means of a pin 74 extending through both the arm and the plate. A link 75 having pivotal connections at its opposite ends couples one end of the arm to the upper end of a post 77 inclined upwardly from the carrier frame and the suction cups 68 are carried on the other end of the arm on a block 78 rigid with a shaft 79 journaled in and extending through the arm.

In order to rock the bell crank about the fulcrum defined by the pin 70, the remaining leg 80 of the crank is pivotally connected at 81 to the upper end of an elongated generally vertical link 82 extending downwardly through the packager frame. This link is adapted to be moved endwise up and down by cam and follower means (not shown) operated by the packaging machine in a manner well known in the art and in timed relation with the advance of the bags along the carrier 19, the link being moved up and down once for each advance of the carrier.

Beginning with the link 82 in its uppermost position shown in FIG. 5, the arm 67 is disposed in the position shown in full in FIG. 5 with the suction cups 68 in the release position over the top of the chute 24. Then, as the link moves downwardly, the crank 69 is rocked counterclockwise about the pin 70 thereby swinging the arm bodily about the pin 74 in a corresponding direction. During this swinging, the arm is turned clockwise about its pivot by the link 75 and, therefore, swings the cups 68 to the pick-up position shown in phantom in FIG. 5. In this position, the cups are disposed one above the other and are in position to contact the generally flat side 17 of the bag dwelling at the discharge station. When vacuum is applied, the cups grip the side of the bag.

As the link 82 moves back downwardly, the arm 67 is swung bodily and clockwise about the pin 70 while turning counterclockwise about the pin 74 back to the release position. Accordingly, the suction cups and the bag carried thereby are swung into alinement with the chute, as shown in FIGS. 7 and 8, where the bag is released simply by disconnecting the vacuum.

It will be seen that the bag is turned through ninety degrees from vertical to horizontal during this transfer and, therefore, is positioned to drop sidewise into the chute. The bag also may be turned through ninety degrees in a horizontal plane to orient the length of the bag with the longer dimension of the chute. This is achieved by turning the block through a right angle relative to the arm by means of a link 83 connecting the remaining corner of the triangular plate 73 to a lever 84 fast at one end on the shaft 79 carrying the block 78. As the arm 67 swings back and forth, the plate 73 turns relative to the arm 67 about the fulcrum defined by the pin 74 to move the link endwise relative to the arm thereby turning the shaft 79 and the block 78 through the desired right angle.

Advantage is taken of the timed transfer of the bags to the chute to drive the conveyor 27 at a correlated rate thereby to count and divide the bags into the stacks. For this purpose, the chain 51 is advanced one step for each bag deposited in the chute by means of a ratchet wheel 85 (FIGS. 4, 5 and 6) turned step by step in timed relation with the swinging of the transfer arm 67. This wheel is fast on a shaft 87 journaled on the upright rails 29 and 30 below the sprocket shaft 54. To turn the ratchet, a lever 88 is pivoted at its lower end at 89 on a block 90 fast on a platform 91 secured to the rail 30 below the ratchet wheel, and an arm 92 is pivoted intermediate its ends on the lever. This arm is supported in a generally horizontal position on the lever and extends toward the periphery of the ratchet wheel with a pawl 93 on the end adjacent the wheel.

The upper end of the lever 88 is connected through an elongated rod 94 (FIGS. 5, 6 and 9) to the lever 71 fast on and turning with the pin 70 providing the crank fulcrum. This lever is positioned angularly about the pin 70 to move the rod 94 endwise toward the ratchet wheel and shift the pawl into engagement with the ratchet teeth as the transfer arm swings to the pick-up position, and then retracts the pawl as the bag is swung to the release position. Thus, the ratchet wheel is turned one step for each bag delivered to the chute.

This turning of the ratchet wheel is applied to the conveyor 27 through a pinion 95 (FIG. 7) fast on the ratchet shaft 87 and meshing with a gear 97 (FIG. 9) on the sprocket shaft 54. The ratio of these gears is selected to correlate the step of the ratchet wheel with the desired length of step of the chain. Preferably, the chain is advanced a distance slightly greater than the flattened thickness of the bag.

As shown most clearly in FIG. 9, the sprocket shaft 54 projects at one end through the rail 29 and through a plate 98 fastened on one side of the shaft to a shouldered stud 99. Discs 100 and 101 are keyed to the shaft on opposite sides of this plate for rotation with the shaft, one 100 of the discs being axially fixed on the shaft. The other disc is pressed against the plate 98 and the latter is pressed against the disc 100 by a coiled compression spring 102 encircling the end of the shaft between the disc 101 and a third disc 103 rigid with the end of the shaft. In this manner, the discs 100 and 101 acting against the plate 98 exert a frictional drag on the sprocket shaft 54 and prevent movement of the conveyor 27 except during a positive forward step of the ratchet wheel.

To snap the platforms 59 into the top of the chute 24 when the desired number of bags have been stacked on the preceding platform, two rollers 104 and 105 (FIGS. 4, 7 and 13) are journaled on and extend between spaced posts 107 extending above the rails 29 and 30 on opposite sides of the upper sprocket wheel 52 so that the rollers lie across the path followed by the platforms passing around the sprocket wheel. The upper roller 104 is offset slightly to the left to contact the arms 60 first as shown in FIG. 13 and thereafter to swing the platforms counterclockwise around the pivots 62 as the conveyor continues to advance. When a platform clears the roller 104, it is released and then snaps against the roller 105. In this manner, the platform about to enter the chute is held out of the path of the falling bags until the last bag, in this instance the thirty-second, is dropped onto the preceding platform. Then, as the arm 67 returns to the pick-up position, the chain is advanced one step further so that the free end of the platform clears the roller 105 and is snapped downwardly by the spring 64 and into the chute to catch the next bag delivered to the chute. A screw 106 may be threaded into the free end of the arm and adjustably spaced relative thereto by shims 106ᵃ for increasing or decreasing the length of the arm thereby to vary the timing of the platform movements.

Mechanism may be provided to prevent indexing of the conveyor if, for any reason, a bag is not delivered to the discharge station 23 as the transfer arm 67 begins its pick-up stroke. For this purpose, a photoelectric cell (not shown), which may be of well-known construction and operation, senses the absence of a bag at the discharge station and initiates a signal which results in the disabling of the ratchet mechanism during the pick-up stroke. One end of the ratchet arm 92 is connected by linkage 108 (FIGS. 5 and 6) to a solenoid 109 which normally is extended as shown in FIG. 5 so that a coiled spring 110 stretched between the lever 88 and the arm 92 may swing the arm clockwise to bring the pawl 93 into position to engage a tooth of the ratchet wheel. When there is no bag at the discharge station, however, the signal from the photoelectric cell activates the solenoid to swing the ratchet arm counterclockwise and lift the pawl away from the wheel as shown in FIG. 6. Thus, the pawl swings back and forth without engaging the wheel and the conveyor remains stationary until the next bag is delivered.

It will be evident that, due to the flowable nature of the powdered material, this material tends to settle near the bottoms of the bags 10 as the latter are filled in upright positions. As a result, the bags bulge outwardly at their lower ends as illustrated in FIGS. 3 and 8. To facilitate the packing of the bags in cartons as well as to enhance the appearance of the individual bags, means is provided for evenly distributing the materail in each bag thereby to compact the stacks. In the present instance, this means includes an electric motor 111 connected to the chute 24 and operable to vibrate the bags therein as the latter pass through the chute.

As shown most clearly in FIGS. 9 and 11, the motor 111 is mounted on one side of the rail 29 with the motor shaft 112 horizontally disposed and paralleling the mounting plate 47 on the side of the chute. Eccentrically journaled on the shaft is a sleeve 113 which is journaled in a bearing 114 in one end portion of an arm 115. The other end of the arm 115 is slotted at 117 to form parallel legs disposed on opposite sides of a triangular plate 118 and pinned at 119 to the plate adjacent its vertex. The base of the plate lies against and is rigidly fastened to the mounting plate 47 by the machine screws 49 which project through the mounting plate and are threaded into the triangular plate.

The studs 50 supporting the chute on the rail 29 are made somewhat longer than the thickness of the blocks 45 and are journaled in bearings 120 (FIG. 11) in the blocks for limited endwise sliding. Thus, the motor 111, which preferably is driven continuously during operation of the machine, imparts a rapid oscillation to the chute through the eccentric 113 and the plate 118. With the chute only slightly larger than the bags, the sides of the chute alternately and sharply strike opposite ends of the bags in the chute to shake the bags back and forth in a horizontal plane. This causes the loose material to distribute itself in an even layer throughout the bags. As shown in FIG. 7, the chute may be made substantially longer than the height of the stacks to insure that each bag is vibrated for a substantial period.

The present invention contemplates the provision of novel apparatus for transferring the stacks 11 to and loading them in the cartons 12, which apparatus facilitates rapid handling of the large stacks and maintains the bags 10 in tightly stacked side-by-side relation so that a relatively large number of bags may be tightly and compactly packed in a relatively small carton. For these purposes, each stack is deposited on a carrier 130 for transfer thereby along a predetermined path between a receiving station 131 (see FIG. 1) adjacent the stacking machine 14 and a loading station 132 where the stacks are transferred into the cartons. Between these stations, the stacks are overturned from the upright position to a horizontal position for transfer horizontally and endwise into the waiting carton at the loading station where the ends of the carton are closed over the ends of the stack. At all times during transfer to the loading station, overturning, transfer into the carton, and closing of the latter, the bags in the stack are held tightly together so that the compact and level stacking accomplished by the vibrator and the chute is maintained throughout the cartoning operation.

To achieve these ends, the stacks are lowered from the chute 24 into holders 133 spaced along the carrier 130 and supported at the receiving station in upright positions. A device 134 (FIGS. 4 and 7) mounted along the path between the stations overturns the holders into reclining positions as the holders approach the loading station. An elongated retaining member 135 (FIGS. 4 and 14) is disposed across the open ends of the holders to abut against the top bags therein and press the latter into the holders as the latter turn, the member being bent to follow the open ends progressively downwardly and remain in blocking relation with the open holder ends. At the loading station, a loader 137 engages both ends of the stack, presses the ends together, and moves the stack laterally and endwise out of the holder and into the carton. This loader includes means for holding the stack in the carton as the ends of the latter are closed.

In the present instance, the carrier 130 is part of the cartoning machine 17 and is supported on two horizontal and parallel rails 138 and 139 overlapping the stacking machine on one end and extending past the loading station at the other end. As shown in FIG. 4, the rails are supported on a base including upright legs 140 and elongated frame plates 141 and 142 extending across the tops of the legs. The legs of the yoke 28 are offset to one side of the post 32 and are joined to the rail 138 (see FIG. 7) so that the stacking and cartoning machine are rigidly connected together. Fastening the rails to the cartoner frame are a plurality of brackets 143 (FIGS. 7 and 17) spaced along the rail 138 and secured to the side plate 141 along a spacer 144.

Adjacent the opposite ends of the rails, shafts 145 (FIGS. 4 and 14) extending between the rails are journaled thereon to turn about horizontal axes and each shaft carries two spaced sprocket wheels 147 (FIG. 14) disposed between the rails. Two endless chains 148 are wrapped around these sprockets to form the carrier 130, each chain being disposed in a vertical plane and having upper and lower horizontal runs 149 and 150 respectively. Evenly spaced along the chains are a plurality of platforms 151 (see FIG. 7) upon which the holders 133 are mounted. Each platform is disposed above the chains when on the upper runs 149 and is formed with two depending legs 152 extending in between the chains and rigidly secured thereto to hold the platforms in horizontal positions above the chains.

Preferably, each holder 133 comprises a bucket of generally rectangular cross-section corresponding generally to the cross-section of the chute 24 and the sides of the bags, the buckets being deep enough to contain a full thirty-two bag stack 11. As shown most clearly in FIG. 14, the holders are formed by parallel side walls 153, a rear wall 154 connecting the side walls, and flanges 155 turned inwardly from the front edges of the side walls to parallel the rear wall and partially close the front of the holder. The free edges of these flanges cooperate to define a slot 157 running down the front of each holder. Similarly, the bottoms of the holders are partially closed by lips 158 extending inwardly from the lower side wall edges to define an opening larger than the conveyor platforms 59 but smaller than the bag sides 17. To guide the stack through the upper ends of the holders, the upper edge portions of the holder walls and the front flanges preferably are flared outwardly as shown in the drawings.

Each holder is mounted on the associated platform 151 by means of a plate 159 lying against the rear wall 154 and fastened thereto by bolts 160 (FIG. 7) with one end portion 161 of the plate extending beyond the lower edge of the rear wall. Intermediate the upper and lower ends of the plate and, in this instance, adjacent the lower end of the holder, two fingers 162 project laterally from the plate and lie on opposite sides of the platform. These fingers are journaled on trunnions 163 which project from the leading and trailing edges of the platform near one side edge thereof and into holes in the fingers thereby mounting the holders on the platforms to tilt about axes defined by the trunnions. In the upright position, each holder is offset to one side of the carrier 130, the left side as viewed in FIG. 7, and in the other, reclining position the holders are horizontal with the rear walls 154 supported by adjusting screws 156 resting on the tops of the platforms and with the upper holder ends opening toward the right-hand side of the carrier.

The holders are supported in the upright position as they approach the chute and, with the rail 138 offset to the right of the chute, the open upper end of the holder dwelling at the receiving station 131 is directly below the lower end of the chute 24. Moreover, the slot 137 in the chute is alined with the slot 157 in the holder so that the loaded platform 59 descending along the chute passes into the holder as the arm 60 of that platform moves downwardly through the slot 157. As the platform passes between the lips 158, the latter engage the opposite edge portions of the bottom bag in the stack and thereafter support the stack in the holder.

As soon as the platform clears the bottom of the holder dwelling at the receiving station, the carrier 130 is indexed one step toward the loading station 132 to move the loaded holder out of the receiving station and bring an empty holder into alinement with the chute to receive the next stack of bags. Then, successive steps of the carrier move the filled holders along the path to the loading station. The carrier may be indexed in timed relation with the advance of the conveyor by suitable mechanism such as a geneva drive 164 (FIG. 26) of well known construction coupled to one of the sprocket shafts 145 and intermittently driven by a motor 165.

Herein, the device 134 for overturning the holders between the receiving station and the loading station includes a follow roller 167 journaled on the lower end portion of the plate 159 to rotate about a vertical axis when the holder is upright and rides along a cam track which bears against the roller and guides the latter through a ninety degree turn as the holder advances along the carrier. Preferably, the track is formed by two plates 168 and 169 (FIG. 4) mounted on the outer side of the rail 138 and extending from a point between the stations to a point just short of the loading station.

The adjacent edges 170 and 171 of these plates are spaced apart a distance corresponding to the diameter of the rollers and lie on opposite sides of the rollers, the edges lying in spaced vertical planes at the leading ends of the plates to receive the rollers on the upright holders. Then the edges curve helically upwardly and outwardly through a quarter turn to swing the rollers through a corresponding turn and tilt the holders over on their sides during a succession of steps of the carrier, this being illustrated in FIG. 14. Although one helical surface disposed generally above the roller would suffice in limiting overturning of the holder by gravity, the lower track insures positive control of the holders at all times. After the holders have been overturned, the upper track terminates and the roller rides only on the lower track which positively holds the holders in the horizontal position.

After the stacks have been transferred from the holders at the loading station, the rollers ride around a semi-circular end plate 172 (FIG. 4) with maintains the holders in the reclining position at the end of the conveyor, and then pass below an elongated bar 173 (FIGS. 4 and 17) extending along the underside of the carrier to the opposite end. Another semi-circular plate 174 bears against the rollers to maintain the latter in the reclining position around the other end of the conveyor. Finally, the rollers pass between two edges 175 and 177 (FIG. 4) turning helically downwardly through a quarter turn to swing the holders back to the upright position. The upper edge 175 may be formed on a plate 178 and the lower edge on the rail 138. The rollers ride between the vertical sides of two horizontal guide bars 179 (FIGS. 4 and 7) extending under the chute so that the holders move past the chute in the upright positions.

Two bars 180 (FIGS. 7 and 17) may be fastened to the inner side of each rail 138 and 139 above and below each run of the chains 148 so that the chains are guided between the bars and are braced thereby against vertical deflection under the forces exerted on the platforms 151. To facilitate sliding of the chains between the bars, rollers 181 are journaled on the chains to ride along the bars.

In the present instance, the retaining member 135 takes the form of an elongated rod supported alongside the carrier on a post 182 with its leading end portion positioned to lie across the top of the holders as they begin to turn over and its trailing end lying across the end of the overturned holder dwelling in the idle station 183 just ahead of the loading station 132. Intermediate its ends, the bar bends helically downwardly to follow the open holder ends downwardly during the overturning operation. As shown most clearly in FIG. 14, the upper edge portions of the side walls 153 preferably are notched at 184 and the rod extends through the notches below the upper edges of the holder to insure that the stacks are pressed firmly into the holders and against the lips 158.

The remainder of the machine 15 for forming, filling, and closing the cartons 12 comprises generally the loader 137, an additional carrier 185 (FIGS. 16 and 17) which supports the cartons horizontally on their sides and advances them edgewise and step by step along a predetermined path through a succession of spaced stations, and mechanism for closing the cartons after the stacks are inserted. The carton carrier 185 is in the form of a pair of endless chains 187 (FIG. 17) overlapping the carrier 130 at one end and supported in vertical planes on spaced sprocket wheels (not shown) journaled between horizontal guide rails 188 (FIGS. 17 and 20) with the upper horizontal run of the chains level with the tops of the rails. The cartons slide along the tops of the rails between blocks 189 (FIG. 16) which are fastened to the chain and spaced apart in accordance with the width of the cartons. This carrier may be driven intermittently in unison with the stack carrier by the geneva drive 164 which may be coupled through a shaft 190 (FIG. 26) to the chain 187.

As illustrated in FIGS. 2 and 14, each carton comprises two rectangular top and bottom walls 191 and two narrow side walls 192 with top, bottom, and side flaps 193, 194 and 195 respectively projecting from these walls at each end. The cartons are stored in a flattened condition in an open-ended magazine 197 (FIG. 4) disposed above the forward end of the carton carrier on the post 182. The successive bottom cartons in the magazine are drawn out in a well-known manner and placed down on the guide rails 188 between two adjacent blocks 189, the carton being opened to the squared shape shown in FIGS. 2 and 14 during transfer to the rails. The carrier then is advanced step by step to carry the open carton to a position adjacent the loading station 132 so that one open end of the carton is adjacent and alined with the open end of the holder dwelling at the loading station for loading of a stack into the carton.

The invention also contemplates constructing the loader 137 in a novel manner such that the stacks are transferred rapidly from the holder to the empty carton and are maintained in tightly and evenly stacked relation during such transfers and also during closing of the cartons. To these ends, the loader includes both an insert ram 198 movable against one end of the stack and through the holder to push the stack out of the holder and into the carton, and a back-up ram 199 movable through the carton, against the other end of the stack and then, in unison with the insert ram, toward the carton to carry the stack into the carton while pressing the stack together. Finally, the rams move in opposite directions to leave the stack in the carton.

In the present instance, each stack is held in the holder dwelling at the loading station by a gate 200 (FIGS. 15, 20 and 22) preparatory to the transfer. This gate includes a pair of vertically spaced legs 201 normally supported in the plane of the trailing end portion of the retaining rod 135 and extending across the open end of the holder to retain the stack therein. A leading flange portion 202 of the gate adjacent the end of the rod may be inclined away from the holders to guide the top bag in each stack along the gate during the final index, this bag now constituting a side end of the stack.

Extending between the holder and the carton at the loading station is a slide 203 (see FIG. 22) supported level with the bottom of the lower side 154 of the holder and the bottom of the carton. Upright partitions 204 may be fastened to the opposite sides of the slide to form a partially enclosed slideway for the stacks during transfer. In the present instance, the slide 203 is supported cantilever fashion on a block 205 and the free end of the slide is adapted to lie above and hold the lower flap 194 downwardly in an out-of-the-way position. To guide the stacks over the slide, the edge of the latter adjacent the holder may be beveled at 207.

The gate 200 is swingable about a vertical axis on a block 208 (FIG. 20) projecting from one of the partitions 204 and is urged clockwise about the axis by a spring 209 stretched between the flange portion 202 and the partition. Thus, the gate legs 201 are spring-pressed against the end of the stack but are yieldable to permit the transfer of the stack out of the holder.

The insert ram 198 includes a rectangular block 210 smaller than the openings in the bottoms of the holders and supported level with the opening in the holder dwelling at the loading station on an elongated horizontal arm 211. The arm and the block are carried on a slide 212 comprising two blocks 213 and 214 disposed side by side on top of a plate 215 guided for endwise sliding back and forth along two parallel rods 217. The latter extend horizontally and transversely across the carrier above the loading station between two parallel end bars 218 and 219 spanning and secured to the opposite ends of the rods. Elongated connecting bars 220 and 221 paralleling the rods on opposite sides thereof support the end bars. It will be seen that the connecting bars 220 and 221 and the end bars 218 and 219 cooperate to form part of a generally rectangular framework 222 above the carrier.

As shown most clearly in FIG. 17, the framework 222 is approximately centered on the cartoning machine and extends substantially beyond the latter on each side with the end bar 219 positioned intermediate the ends of the connecting bars and generally above the carton held at the loading station. Supporting the framework in this position on one side are two legs 223 inclined upwardly and outwardly from the frame and secured at their upper ends to the connecting bars. On the other side of the frame, the left-hand side as viewed in FIG. 17, a platform 224 is supported on brackets 225 bolted at 227 (FIGS. 4 and 19) to the rail 138 and supports two legs 228 inclined upwardly and outwardly to the left under the left end of the framework, these legs being fastened as by welding to the left ends of the connecting bars.

Depending from the slide 212 are two vertical studs 229 threaded at their upper ends into the plate 215 and secured at their lower ends to the arm 211 adjacent one end thereof by nuts 230 threaded on the studs and tightened against opposite sides of the arm. In this manner, the arm is suspended below the slide for movement therewith and extends toward the holder with the block 210 carried substantially in advance of the slide. When the latter is disposed adjacent the end bar 218, that is, on the left end of the rods 217, the block 210 is in an out-of-the-way rest position (FIGS. 17 and 27) on the left-hand side of the holder dwelling at the loading station. As the slide moves along the rods toward the right, the insert ram is carried toward the holder and moves the block 210 through the holder to engage and push the stack therein into the waiting carton.

The back-up ram 199 may be supported in a similar manner on the opposite side of the carton. For this purpose, two rods 231 are supported horizontally on the framework 222 between end bars 232 spaced apart along and spanning the connecting bars, and a second slide 233 is slidable back and forth along these rods. Two studs 234 depending from the slide are fastened at their lower ends to one end of a horizontal arm 235 so that the latter extends toward the holder. On the free end of this arm is a block 237 alined with the open end of the carton and also with the upper end of the holder at the loading station.

As the slide 233 moves back and forth along the rods 231, the ram block 237 is carried toward the carton from an out-of-the-way position on the right-hand side of the carton and moves through the latter to an extended position in which the block engages the adjacent end of the stack. Then, in returning to the rest position, the block passes back through the carton. The size and shape of the block are correlated with the spacing of the gate legs 201 so that the block engages the stack between the legs.

Suitable mechanism is provided for moving the rams 198 and 199 through the cycle to carry a stack from the holder and into the carton. In the present instance, this mechanism includes a camshaft 238 (FIGS. 4, 17 and 26) journaled on the frame below the carrier 130 to turn about an axis paralleling the carton path and driven intermittently in timed relation with the advance of the stacks and the cartons by the motor 165, the geneva drive 164 being coupled to the motor through the camshaft. Fast on the shaft are cams 239 and 240 controlling the movements of the slides 212 and 233 and, consequently, the movements of the rams.

Herein, a pin 241 (FIGS. 16, 17 and 18) rigid with the slide 212 projects laterally therefrom and through one end of a generally horizontal link 242 extending across the carrier above the latter and pivotally connected at its other end to the upper end of an upright arm 243 of a bell crank 244. The latter is fulcrumed on the frame on a horizontal shaft 245 supported between brackets 247 projecting outwardly from the frame. The other arm 248 of the bell crank 244 extends inwardly toward the camshaft and is connected through linkage 249 to a lever 250 pivoted at 251 on the opposite side of the frame and extending inwardly over the camshaft. A follower roller 252 is journaled on the lever to ride on the cam 239 and rock the lever up and down as the camshaft turns.

This rocking of the lever 250 swings the crank arm 243 back and forth about its fulcrum 245 and, through the link 242 and the slide 212, shifts the insert ram 198 back and forth through the holder. The cam 239 may be shaped to control the length and steps in the forward and return strokes of the ram in a well-known manner.

To actuate the back-up ram 199, a second bell crank 253 is fulcrumed on the shaft 245 alongside the crank 244 and is rocked back and forth in a similar manner by the cam 240. A lever 254 is fulcrumed at one end on the pivot 251 alongside the lever 250 and extends across the camshaft with a roller 255 intermediate its ends riding on the cam 240. Through linkage (not shown) similar to the linkage 249, the rocking of the lever is transmitted to the upright crank arm 259, the upper end of which is pivotally connected at 260 to one end of a rod 261. The other end of the rod is pivoted on a pin 262 projecting laterally from the slide 233 so that rocking of the crank 253 moves the slide back and forth along the rods 231 and the ram 199 through the carton.

It will be seen that the cams 239 and 240 may be shaped and positioned to bring the rams 198 and 199 into engagement with opposite ends of the stack and then move the rams in the same direction at the same rate to carry the stack into the carton. The direction of movement of the ram 198 is reversed after the latter has reached the adjacent end of the carton while the ram 199 continues on to its rest position.

Preferably, a safety device 263 is incorporated in the drive of the slide 212 to disconnect the slide from the crank 243 in the event that abnormal resistance is encountered by the ram in its forward stroke. Such resistance might be the result of misalinement of the holder with the ram or jamming of the stack during transfer. As shown in FIGS. 16 and 17, a switch 264 is carried on the link 242 and the latter is made extensible to separate the switch from its actuator 265 under a predetermined force, the switch being mounted on one section of the link and the actuator on the other with a detent (not shown) normally holding the sections together. When the ram encounters undue resistance, the detent releases the two sections of the link which thus is permitted to extend and activate the switch. The latter may be disposed in the control circuit (FIG. 26) of the machine so that the machine is de-activated before serious damage can occur.

While various means may be used for holding the stacks together after the rams have returned to their rest positions and until the carton ends have been at least partially closed, preferably this means includes a finger 267 movable against one end of the stack when the latter is in the carton and before the ram 198 is retracted. Herein, one end of the finger 267 is fast on the lower end of a lever 268 fulcrumed intermediate its ends on a pin 269 projecting laterally from one connecting bar 221 of the framework 222 adjacent the end bar 219. The opposite end portion of this lever is bent upwardly as shown in FIGS. 17 and 20 and connected through a link 270 to a rod 271 journaled for back and forth endwise sliding in blocks 272 and 273 (FIGS. 16, 17 and 21) spaced apart along the upper edge of the bar 221.

Coiled around this rod 271 between the blocks is a compression spring 274 disposed between the block 273 and a ring 275 telescoped onto the rod and axially fixed thereto as by a set screw (FIG. 21). This spring acts against the ring 275 to urge the rod to the left and a cam 276 toward the block 272 when the rod is in its released position (FIG. 16) and cooperates with the cam 276 fast on the free end of the rod to determine the axial position of the rod in the released position.

As shown most clearly in FIG. 20, the finger 267 is offset to one side of the lever and curves downwardly and toward the adjacent end of the carton. When the rod is in the released position, the lever 268 is held as shown in FIG. 17 with the finger disposed in an out-of-the-way position generally above the holder at the loading station. Journaled on and projecting laterally from the lever adjacent the finger is a roller 277 disposed in the plane of a cam plate 278 vertically disposed and bolted at 279 (FIG. 20) to one side of the slide plate 215. The cam projects forwardly from the slide with a leading edge 280 inclined downwardly and rearwardly. Thus, as the slide moves along the rods 217 during the forward stroke of the ram 198, the cam surface 280 engages the roller 277 and presses the latter downwardly to swing the lever 268 about the fulcrum 269 and toward the carton, this being counterclockwise as viewed in FIG. 17. The incline and placement of the cam is such that the finger approaches the end of the stack after the latter is in the carton and before the ram is retracted. A notch 281 may be cut in the upper edge of the block 210 to receive the free end of the finger while the ram is in its extended position shown in FIG. 29.

To hold the finger in this position as the slide 212 and cam 278 are retracted, a latch 282 is provided to catch and hold the rod 271 thereby to lock the lever 268 in place. This latch may include a dog 283 (see FIG. 21) fastened by screws 284 to one side of a lever arm 285 pivoted on a pin 287a on the upper part of the block 273 so that the lever 285 normally rests horizontally on top of the block 273 and projects rearwardly therefrom with the dog 283 hanging below the level of the upper edge of the cam 276 and in the path of the latter. Thus, as the lever swings toward the carton and the rod moves rearwardly, the cam 276 is shifted against and past the dog, lifting the dog and the free end of the lever 285, and then permitting the dog to drop in front of the cam when the finger is in its holding position. The dog and the cam preferably are formed with correspondingly inclined surfaces 287 and 288 (FIG. 21) to facilitate lifting of the dog out of the path of the cam. It will be seen that the spring 274 is compressed as the lever is swung toward the carton and, therefore, urges the rod and the ring to the left as viewed in FIG. 21 so that the dog abuts against the cam and latches the rod in place.

Release of the rod 271 after an interval of sufficient length to permit closing of the carton is effected by a second cam surface 289 on the slide operable to lift the dog out of the path of the cam. As shown most clearly in FIGS. 17 and 20, this cam is the inclined end of a lug 290 screwed to the top of the block 214 in the plane of a roller 291 projecting laterally from an integral depending portion 292 of the lever 285. As the slide 212 reaches the end of its return stroke, the cam surface 289 moves against the roller 291 and raises the latter to lift the lever 285. This permits the spring 274 to snap the rod back to its released position thereby swinging the finger away from the stack.

Prior to retraction of the finger, the carton is partially closed by a novel device 293 operable to fold both the leading and trailing side flaps 195 inwardly and hold these flaps closed until the carton has been indexed beyond the loading station and into contact with an elongated stationary plow 294. This closing device is shown most clearly in FIGS. 24 and 25 and its operation is illustrated in FIGS. 30 and 31.

In the present instance, the device 293 is mounted for bodily rotation about an axis paralleling the carton path by means including a shaft 295 (FIGS. 16, 24 and 25) journaled in bearings 297 alongside the carton carrier and a shank 298 fast at one end on a sleeve 299 mounted on one end of the shaft so that the shank extends transversely of and preferably perpendicular to the shaft. On the free end of the shank is a crosspiece 300 spaced from the shaft a distance equal to the spacing of the adjacent carton ends from the shaft so as to be disposed in a pressing position shown in phantom in FIG. 24 when the shank is horizontal and disposed between the shaft and the cartons. In this position, the crosspiece is closely adjacent the plane of the carton ends.

Fast on the end portion of the crosspiece in advance of the latter is an elongated member 301 inclined forwardly and toward the shaft at a suitable angle such as forty-five degrees (see FIGS. 30 and 31). Fast on the other end is a second elongated member 302 extending rearwardly and in this instance upwardly in a plane paralleling the carton end, herein at an angle of approximately thirty degrees as shown in FIG. 24. The extreme end portions of each member may be bent away from the carton ends at a further angle as shown in FIG. 30.

In the present instance, the crosspiece 300 and the two members 301 and 302 are formed integrally with each other by bending a single rod as shown in the drawings. The shank comprises a second rod secured as by welding to the crosspiece and to the sleeve. To close the leading and trailing side flaps, the device is reciprocated bodily about the shaft intermittently and in timed relation with the advance of the cartons, the shank first moving clockwise as viewed in FIG. 25 through one-quarter turn and then returning to its rest position shown in full in FIG. 24 for each step of the carton carrier. The movements of the device are timed so that the member 301 is disposed in the path of the leading side flap 195 of the carton just filled (see FIG. 30) as the carrier starts to index. It will be seen, therefore, that this flap moves against the member and is cammed inwardly and closed thereby as the carton moves (see FIG. 30). Then, the flap is held closed by the intermediate portion 300 until it passes under the plow 294.

While this operation is being performed, the shank moves downwardly so that the upwardly inclined member 302 moves across the upper edge of the trailing side flap 195 on the adjacent filled carton (see FIGS. 24 and 30) dwelling at an idle station 303 beyond the loading station 132. As this member moves downwardly and the cartons are indexed one step, the trailing flap is swept forward and closed. The length of the indexing step is sufficient to carry the leading flap under the stationary plow 294 during the first step after loading and the trailing flap under the plow during the second. A suitable fixed guide rod 304 (FIGS. 27, 28 and 29) may be provided to hold the trailing flap in an out-of-the-way position until the carton is indexed toward the idle station 303.

As shown in full in FIGS. 29 and 30 and in phantom in FIG. 31, the holding finger 267 maintains contact with the stack end until after the carton has been indexed far enough to close the leading side flap (FIG. 31) so that this flap thereafter holds the stack together. The finger slides along the end of the stack during indexing and then is retracted as it approaches the trailing edge of the stack end. To correlate the motions of the finger 267 and the device 293 with the indexing of the carrier, the shaft 295 is driven from the camshaft 238 in a manner well known in the art to swing the device downwardly just as the carrier, which also is driven from the camshaft, begins to index and just before the end of the return stroke of the ram 198. Thus, the cartons index when the arm is in the path of the leading side flap, and the spring-loaded latch rod 271 is released during the indexing of the cartons when the finger is near the trailing edge of the stack end.

To hold the bags against falling out of the end of the carton opposite the holder after the back-up ram 199 returns to its rest position, the leading side flap is folded closed before the stack is transferred. For this purpose, a folding element 305 is disposed alongside the carton path to engage and bend in the leading flap as the empty carton moves into the loading station. Herein, this element is another elongated stationary plow terminating substantially beyond the leading side of the carton dwelling at the loading station. Thus, this plow engages the leading side flap during indexing, first bending it progressively inwardly as the carton moves and then holding it tightly closed.

As shown most clearly in FIGS. 27 through 30, the back-up ram 199 is alined with the portion of the carton end remaining open and the block 237 is made small enough to pass freely through this portion in moving toward and away from the stack. As the latter is slid into the carton, the now closed leading side flap serves as a stop to limit insertion of the stack and hold the stack as the ram continues on to the rest position.

Closing of the trailing flap on this end is accomplished by a pusher 307 (FIGS. 16, 23, 30 and 31) which sweeps the flap forwardly as the carton indexes, and holds the flap until it passes under the plow 305. This pusher comprises a flat plate 308 mounted on the free end of a finger 309 clamped at one end around a pin 310 (see FIG. 23) journaled on one end of a bar 311. The other end of the latter is clamped around the upper end of a pin 312 journaled in and projecting downwardly through a block 313 screwed at 314 to the machine frame at a point spaced from the carton end to be closed. Below this block, one end of a lever 315 is fast on the pin and the other end is pivotally connected to an elongated link 317 extending under the carrier to a point adjacent the shaft 295 as shown in phantom in FIG. 16. This link is fulcrumed on a lever 318 fixed to the lower end of a pin 319 rotatably supported in and extending upwardly through the frame. Fast on the upper end of this pin is a lever 320 connected at its free end to a link 321 which has a swivel connection with a crank 322 on the shaft 295.

As the shaft 295 turns, the link 321 is moved endwise back and forth to swing the levers 320 and 318 in unison about the fulcrum defined by the pin 319. This swinging moves the elongated link 317 endwise back and forth and swings the lever 315 and the bar 311 about the pin 312. Intermediate the ends of the finger 309 is a roller 323 (FIG. 23) depending from the finger into a horizontal groove 324 in a bar 325 fastened to the frame by screws 327. The roller is slidably guided in this groove so that the finger 309 moves the plate 308 toward the flap 195 from the position shown in FIGS. 16 and 30 to the position shown in FIGS. 23 and 31 as the bar 311 turns counterclockwise about the pin 310. Thus, the finger sweeps the flap closed and holds it until the flap passes under the plow 305 (FIG. 31). Then, the bar swings back to swing the finger away from the carton into position to approach the trailing flap on the next carton to be filled.

Closure of the remaining flaps may be accomplished in a manner well known in the art as the carton is advanced along the carrier. Adhesive is applied to the top or bottom flaps 193, 194 and the two flaps at each end are folded closed in successive steps.

Preferably, the operation of the cartoning machine 15 is controlled by the stacking machine 14 to insure correlation of the movements of the parts of the two machines. For this purpose, a cam 328 (FIGS. 5 and 9) is mounted on the ratchet wheel shaft 87 to turn therewith and contact a follower 329 once during each revolution of the ratchet wheel 85 thereby to activate a switch LSD1. The wheel 85 is formed with a predetermined number of teeth corresponding to the number of bags to be included in each stack, thirty-two in this instance.

Initially, the cam 328 is positioned about the shaft to activate switch LSD1 when the conveyor is in the position shown in FIG. 7, that is, when one platform 59 is clear of the lower end of the holder 133 dwelling at the receiving station 131 and the next platform has not yet entered the top of the holder. Such adjustment is accomplished by loosening the screws 330 holding the cam on the wheel and turning the cam as permitted by arcuate slots 331 in the wheel through which the screws project. Then, the screws are tightened against the wheel to fix the angular position of the cam. As shown in FIG. 26, switch LSD1 may be disposed in the control circuit of the electric motor 165 for driving the camshaft 238, the motor being coupled to the camshaft through sprocket wheels 332 and 333 and an endless chain 334. Normally, the switch actuator 335 (FIGS. 5, 9 and 26) is positioned against a contact 337 (FIG. 26) to complete a circuit between two power lines 338 and 339 through relay CRSC to energize the latter and close contacts CRSC1 and CRSC2, the former completing a holding circuit through a normally closed switch LSSC.

When the actuator 335 of switch LSD1 is shifted by the cam 328 against a contact 340 upon the insertion of the thirty-second bag in a holder, a circuit is completed through contacts 341, closed by a run switch, to a relay MSD. When energized, this relay closes switches MSD2 to energize the motor 165 to rotate the camshaft. Mounted on the camshaft to turn therewith are two cams 342 and 343 respectively controlling the position of a normally open switch LSDS and switch LSSC. Each of these cams is positioned to open the associated switch once during each revolution of the camshaft and the rise portions of the cams are spaced 180 degrees apart. As the shaft begins to turn, the cam 342 permits switch LSDS to close and complete a holding circuit, through now closed switch MSD1, to relay MSD. After the shaft turns 180 degrees, the cam 343 opens switch LSSC breaking the holding circuit to relay CRSC and thereby opening contacts CRSC1 and CRSC2. After a full camshaft revolution, cam 342 opens switch LSDS and breaks the holding circuit of relay MSD thereby de-energizing the latter and opening switches MSD1 and MSD2. As a result, the motor 165 is de-energized and the camshaft ceases to turn.

To insure that the holding circuit for relay MSD is completed through switch LSDS before the actuator 335 of switch LSD1 is permitted to move away from the contact 340, the cam 328 on the ratchet shaft is shaped to hold the switch actuator 335 against the contact 337 through a plurality of steps of the ratchet wheel, herein four steps. With the cam 343 breaking the holding circuit of relay CRSC only after 180 degrees of the camshaft rotation, it is made certain that the motor 165 has started. Then, the cam 342 opens switch LSDS after 360 degrees of rotation to break the final holding circuit only after the indexing of the carriers 130 and 185 through one step is completed and the various devices operated by the camshaft have completed one full cycle.

I claim as my invention:

1. In a machine for loading stacks of flat packages of predetermined size in cartons and closing the latter, the combination of, a base, a carrier supported on said base, a plurality of holders spaced along said carrier and mounted thereon for back and forth swinging between upright positions and reclining positions, one end of each holder opening upwardly in the upright position and laterally in the reclining posiiton, mechanism for advancing said carrier along a predetermined path to present said holders successively to a receiving station and then to a loading station, a device disposed along said path and operable to maintain said holders upright at said receiving station and overturn the holders into the reclining position as the holders advance toward the loading station, mechanism for stacking a predetermined number of packages in each holder at said receiving station, the other end of each holder having an opening therein smaller than said predetermined size whereby said other end supports the packages in the holder, a retaining member for holding the stacks against falling through said one end as and after each holder is overturned, means for supporting an empty carton open at both ends at said loading station with one of said carton ends adjacent and alined with said one holder end, an insert ram supported on said base on one side of said holder in alinement with said smaller opening and for back and forth movement through said holder toward and away from the carton, a back-up ram supported on said base in alinement with the other of said carton ends and movable back and forth through the carton toward and away from said holder, mechanism for moving said rams first into engagement with opposite ends of said stack, then in unison toward the carton to carry the stack into the carton, and finally in opposite directions away from the carton, means for closing the carton ends tightly over the stack ends, and means for holding the stack tightly together in the carton after the rams are moved in said opposite directions and until the carton ends are at least partially closed.

2. In a machine for loading stacks of flat packages of predetermined size into cartons, the combination of, a base, a holder for supporting a stack of packages on said base, said holder having a first opening in one end larger than said predetermined size to pass the packages sidewise into and out of the holder and a second opening in the opposite end smaller than said predetermined size whereby said other end supports the packages in the holder, means for supporting the holder and an empty carton open at both ends on said base with one of said carton ends adjacent and alined with said first opening to receive the stack, an insert ram supported on said base in alinement with said second opening and for back and forth movement through said holder toward and away from the carton, a back-up ram supported on said base in alinement with the other of said carton ends and with said first opening, said back-up ram being movable back and forth through the carton toward and away from said holder, mechanism for moving said rams first into engagement with opposite ends of said stack, then in unison toward the carton to carry the stack into the carton, and finally in opposite directions to leave the stack in the carton, means for holding the stack against passing through said other carton end, a finger mounted on said base for back and forth movement between a blocking position adjacent said one carton end and a released position, said finger being spaced away from said one carton end in said released position to permit transfer of a stack into the carton and engaging the adjacent end of the stack when in said blocking position, and mechanism responsive to the movements of said insert ram and operable to move said finger into said blocking position after the stack is within the carton and before the insert ram is moved away from the carton.

3. In a machine for loading stacks of flat packages of predetermined size into cartons and closing the latter, the combination of, a base, a holder for supporting a stack of packages on said base, said holder having a first opening in one end larger than said predetermined size to pass the packages sidewise into and out of the holder and a second opening in the opposite end smaller than said predetermined size whereby said other end supports the packages in the holder, means for supporting the holder and an empty carton open at both ends on said base with one of said carton ends adjacent and alined with said first opening to receive the stack, an insert ram supported on said base in alinement with said second opening and for back and forth movement through said holder toward and away from the carton, a back-up ram supported on said base in alinement with the other of said carton ends and with said first opening, said back-up ram being movable back and forth through said carton toward and away from said holder, mechanism for moving said rams first into engagement with opposite ends of said stacks, then in unison toward the carton, and finally in opposite directions to leave the stack in the carton, means for closing the carton ends over the ends of the stacks, and means for holding the stack tightly together in the carton after the rams are moved in said opposite directions and until the carton ends are at least partially closed.

4. In a machine for loading stacks of flat packages of predetermined size into cartons, the combination of, a base, a holder for supporting a stack of packages on said base, said holder having a first opening in one end larger than said predetermined size to pass the packages sidewise into and out of the holder and a second opening in the opposite end smaller than said predetermined size whereby said other end supports the packages in the holder, means for supporting an empty carton open at one end on said base with said one carton end adjacent and alined with said first opening to receive the stack, means partially closing the other end of said carton, an insert ram supported on said base in alinement with said second opening and for back and forth movement through said holder toward and away from the carton, a back-up ram supported on said base in alinement with said partially closed carton end and with said first opening, said back-up ram being movable back and forth through said partially closed end toward and away from said holder, mechanism for moving said rams first into engagement with opposite ends of said stack, then in unison toward the carton to carry the stack against said partially closed end, and finally in opposite directions to leave the stack in the carton, means for closing the carton ends over both ends of the stack, and means for holding the stack against falling out of said one carton end until the latter is at least partially closed.

5. In a machine for loading stacks of flat packages of predetermined size into cartons, the combination of, a base, a holder for supporting a stack of packages on said base, said holder having a first opening in one end larger than said predetermined size to pass the packages sidewise into and out of the holder and a second opening in the opposite end smaller than said predetermined size whereby said other end supports the packages in the holder, means for supporting the holder and an empty carton open at both ends on said base with one of said carton ends adjacent and alined with said first opening to receive the stack, an insert ram supported on said base in alinement with said second opening and for back and forth movement through said holder toward and away from the carton, a back-up ram supported on said base in alinement with the other of said carton ends and with said first opening, said back-up ram being movable back and forth through said carton toward and away from said holder, and mechanism for moving said rams first into engagement with opposite ends of said stack, then in unison toward the carton, and finally in opposite directions to leave the stack in the carton.

6. In a machine for loading stacks of flat packages of predetermined size into cartons, the combination of, a base, a holder for supporting a stack of packages on said base, said holder being open at both ends, means for supporting said holder and an empty carton open at both ends on said base with one of said carton ends adjacent and alined with one of said holder ends, an insert ram mounted on said base for back and forth movement through said holder toward the carton to push the stack out of the holder and into the carton, a finger movable back and forth between a blocking position across said one carton end and a released position, said finger being spaced from said one carton end in said released position to permit transfer of a stack into the carton, and engaging the adjacent end of the stack when in said blocking position, a spring urging said finger toward said released position, mechanism responsive to the movements of said ram and operable to move said finger into said blocking position after the stack is within the carton and before the ram is moved away from the carton, a latch for holding said finger in said blocking position as said ram is moved away, means for closing said one carton end across said adjacent stack end, and means for tripping said latch after said one carton end is at least partially closed and releasing said finger to the action of said spring.

7. In a machine for loading stacks of flat packages of predetermined size into cartons, the combination of, a base, a holder for supporting a stack of packages on said base, said holder being open at both ends, means for supporting said holder and an empty carton open at both ends on said base with one of said carton ends adjacent and alined with one of said holder ends, an insert ram mounted on said base for back and forth movement through said holder toward the carton to push the stack out of the holder and into the carton, a finger movable back and forth between a blocking position across said one carton end and a released poistion, said finger being spaced from said one carton end in said released position to permit transfer of a stack into the carton, and engaging the adjacent end of the stack when in said blocking position, and mechanism responsive to the movements of said ram and operable to move said finger into said blocking position after the stack is within the carton and before the ram is moved away from the carton.

8. A device for closing the leading and trailing side flaps at corresponding ends of successive cartons supported on a carrier and advanced thereby along a predetermined path through a succession of stations, said device including, in combination, a crosspiece disposed on one side of said path between two stations and paralleling the plane of said carton ends, means supporting said crosspiece for bodily rotation about an axis on said one side to swing the crosspiece through a pressing position closely adjacent said plane, a first elongated member fast on the end of said crosspiece in advance of the latter and inclined forwardly and away from said plane when in said pressing position, a second elongated member fast at one end on the other end of said crosspiece, and means for swinging said crosspiece through said pressing position as a carton passes between said stations whereby said first member cams the leading flap of said carton closed and said crosspiece holds the flap closed, said second member extending rearwardly from said crosspiece to pass across an edge of the trailing side flap of the preceding carton and being inclined relative to said crosspiece whereby the free end portion of the second member trails the crosspiece and sweeps said trailing flap closed.

9. In a machine for loading stacks of flat packages of predetermined size into cartons, the combination of, a base, a carrier supported on said base, a plurality of holders spaced along said carrier, mechanism for advancing said carrier along a predetermined path to present said holders successively to a receiving station and then to a loading station, a device for maintaining said holders in upright positions at said receiving station and overturning said holders as the latter advance toward said loading station, one end of each holder opening upwardly in the upright position and laterally in the reclining position, mechanism for stacking a predetermined number of packages in an upright stack in the holder at said receiving station, an elongated rod disposed along said path between said stations and lying across said open ends of said holders, said rod being bent downwardly to follow said open ends as the holders are overturned thereby to hold the packages in said holders as the latter are overturned, and a loader engageable with the stack in the holder at said loading station and operable to transfer said stack laterally from the holder into a carton.

10. In a machine for loading stacks of flat packages of predetermined size into cartons, the combination of, a base, a carrier supported on said base, a plurality of holders spaced along said carrier and each mounted thereon for back and forth movement between an upright position and a reclining position, one end of each holder opening upwardly in the upright position and laterally in the reclining position, mechanism for advancing said carrier along a predetermined path to present said holders successively to a receiving station and then to a loading station, mechanism for stacking a predetermined number of packages in the holder dwelling at said receiving station, a device disposed along said path and operable to maintain each holder upright at said receiving station and to overturn the holders into the reclining positions as the holders advance toward the loading station, a retaining member for holding the stacks against falling through said open ends as and after each holder is overturned, said retaining member terminating adjacent said loading station, a gate normally disposed in a blocking position across the open end of the holder at said loading station, means yieldably urging said gate into said blocking position to hold the stack in the holder, and a loader at said loading station engageable with the stack in the holder and operable to open said gate and transfer the stack laterally out of the holder and into a carton.

11. In a machine for loading stacks of flat packages of predetermined size into cartons, the combination of, a base, a carrier supported on said base, a plurality of holders spaced along said carrier and fulcrumed thereon for back and forth swinging between an upright position and a reclining position, one end of each holder opening upwardly in the upright position and laterally in the reclining position, mechanism for advancing said carrier along a predetermined path to present said holders successively to a receiving station and then to a loading station, a follower on each of said holders, a cam extending along said path in position to engage said followers and maintain said holders upright at said receiving station and overturn the holders into the reclining positions as the holders advance toward the loading station, mechanism for vertically stacking a predetermined number of packages in each holder at said receiving station, a retaining member for holding the stack against falling out of the open end of each holder as the latter is overturned, and a loader engageable with the stack in the holder at said loading station and operable to transfer the stack laterally through said open end and into a carton.

12. In a machine for loading stacks of flat packages of predetermined size into cartons, the combination of, a base, a carrier supported on said base, a plurality of holders spaced along said carrier and each mounted thereon for back and forth swinging between an upright position and a reclining position, one end of each holder opening upwardly in the upright position and laterally in the reclining position, mechanism for advancing said carrier along a predetermined path to present said holders successively to a receiving station and then to a loading station, a device disposed along said path and operable to maintain each holder upright at said receiving station and to overturn the holders into the reclining position as the holders advance toward the loading station, mechanism for stacking a predetermined number of packages in each holder at said receiving station, a retaining member for holding the stacks against falling through said open end as and after each holder is overturned, and a loader engageable with the stack in the holder at said loading station and operable to transfer the stack in the holder at said loading station and operable to transfer the stack laterally through said open end into a carton.

13. A device for closing the leading and trailing side flaps at corresponding ends of successive cartons supported on a carrier and advanced thereby along a predetermined path, said device including, in combination, a crosspiece disposed on one side of said path and extending along the plane of said carton ends, means supporting said crosspiece for bodily movement about an axis spaced from said path to swing the crosspiece into a pressing position closely adjacent said plane, a first elongated member fast on the end of said crosspiece in advance of the latter and inclined forwardly and away from said plane when in said pressing position, a second elongated member fast at one end on the other end of said crosspiece, means for swinging said crosspiece about said axis and into said pressing position as a carton passes whereby said first member cams the leading flap of said carton closed and said crosspiece holds the flap closed, and means for holding said leading flap closed after the carton passes, said second member extending rearwardly from said crosspiece to lie across an edge of the trailing side flap of said carton and being inclined relative to said crosspiece whereby the free end portion of the second member trails the crosspiece and sweeps the trailing flap closed as the crosspiece moves toward said pressing position.

References Cited in the file of this patent

UNITED STATES PATENTS 2,826,881     Negoro _____ Mar. 18, 1958
3,043,070     Cammack _____ July 10, 1962